United States Patent
Shimotsu

(10) Patent No.: US 9,500,838 B2
(45) Date of Patent: Nov. 22, 2016

(54) LENS DRIVING APPARATUS AND METHOD

(71) Applicant: FUJIFILM CORPORATION, Tokyo (JP)

(72) Inventor: Shinichi Shimotsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 130 days.

(21) Appl. No.: 14/670,449

(22) Filed: Mar. 27, 2015

(65) Prior Publication Data

US 2015/0198783 A1   Jul. 16, 2015

Related U.S. Application Data

(63) Continuation of application No. PCT/JP2013/072662, filed on Aug. 26, 2013.

(30) Foreign Application Priority Data

Sep. 28, 2012   (JP) ................................ 2012-217442

(51) Int. Cl.
*H02K 41/00* (2006.01)
*G02B 7/04* (2006.01)
*G02B 7/08* (2006.01)
*G02B 7/02* (2006.01)
*H02K 41/035* (2006.01)

(52) U.S. Cl.
CPC ................ *G02B 7/04* (2013.01); *G02B 7/023* (2013.01); *G02B 7/08* (2013.01); *H02K 41/0356* (2013.01); *H02P 25/034* (2016.02)

(58) Field of Classification Search
CPC .......... G02B 7/04; G02B 7/023; G02B 7/08; H02P 25/034; H02K 41/0356
See application file for complete search history.

(56) References Cited

U.S. PATENT DOCUMENTS

| | | | | |
|---|---|---|---|---|
| 4,622,604 A | * | 11/1986 | Hashimoto | G11B 21/085 360/78.07 |
| 5,287,234 A | | 2/1994 | Suzuki | |
| 5,939,804 A | | 8/1999 | Nakao et al. | |
| 6,011,668 A | * | 1/2000 | Choi | G11B 5/5534 360/78.04 |
| 8,362,720 B2 | * | 1/2013 | Aso | G01B 7/003 318/135 |
| 2001/0017353 A1 | * | 8/2001 | Yamashita | H01J 27/08 250/424 |
| 2002/0141098 A1 | | 10/2002 | Schlager | |
| 2009/0262631 A1 | * | 10/2009 | Goami | G11B 7/0932 369/112.23 |

FOREIGN PATENT DOCUMENTS

| | | |
|---|---|---|
| JP | 50-084776 | 7/1975 |
| JP | 04-221471 | 8/1992 |

(Continued)

OTHER PUBLICATIONS

International Search Report—PCT/JP2013/072662—Nov. 26, 2013.

*Primary Examiner* — Twyler Haskins
*Assistant Examiner* — Padma Haliyur
(74) *Attorney, Agent, or Firm* — Young & Thompson

(57) ABSTRACT

A lens driving apparatus for a lens includes a voice coil motor. A coil position of a coil is detected. A table memory stores a correction factor for each one of plural values of the coil position according to flux density distribution. The correction factor is read from the table memory according to the detected coil position. A coil current is corrected by use of the correction factor for each coil position. The corrected coil current is caused to flow through the coil, with which the lens is moved together along an optical axis. Consequently, changes in a moving speed of the lens can be prevented.

6 Claims, 31 Drawing Sheets

(56) References Cited

FOREIGN PATENT DOCUMENTS

| JP | 05-313054 | 11/1993 |
| JP | 05-313055 | 11/1993 |
| JP | 08-033386 | 2/1996 |
| JP | 2000-102285 | 4/2000 |
| JP | 2003-009584 | 1/2003 |
| JP | 2011-123432 | 6/2011 |

* cited by examiner

LENS DRIVING APPARATUS AND METHOD

CROSS-REFERENCE TO RELATED APPLICATION

This application is a Continuation of PCT International Application PCT/JP2013/072662 filed on Aug. 26, 2013, which claims priority under 35 USC 119(a) from Japanese Patent Application No. 2012-217442 filed on Sep. 28, 2012. The above application is hereby expressly incorporated by reference, in its entirety, into the present application.

BACKGROUND OF THE INVENTION

1. Field of the Invention

The present invention relates to a lens driving apparatus and method. More particularly, the present invention relates to a lens driving apparatus and method in which changes in a moving speed of a movable lens in a lens assembly are prevented to remove unfamiliar feeling in manipulation of a user.

2. Description Related to the Prior Art

A lens driving apparatus (lens assembly) is provided in a digital camera, video camera or the like for focusing, zooming and the like. An example of a motor in the lens driving apparatus is a voice coil motor, which includes a magnet, a yoke and a coil, and can operate at a high speed. In the voice coil motor, a current flows through the coil, which is driven by electro-magnetic force and moves along the yoke. A lens (lens optics) is coupled with the coil, and can be moved together with the coil. An example of the lens is a focus lens, zooming lens (variator lens) and the like. The focus lens is movable to adjust the focus of an object image. The zooming lens (variator lens) is a component in a zoom lens system, and adjusts a magnification of the object image in directions to telephoto and wide-angle sides. The use of the voice coil motor in the lens driving apparatus is effective in reducing the size of the digital camera, video camera and the like, and reducing noise in driving the lens.

U.S. Pat. No. 5,939,804 (corresponding to JP-A 10-225083) discloses two yokes opposed to one another. The yokes have the magnet in combination with the coil for supporting the lens. A magnetic sensor is disposed between the yokes as a position detector. Those operate for reducing influence of leaked magnetic flux to the magnetic sensor. Also, JP-A 2011-123432 discloses the yokes to constitute two magnetic circuits for driving. There are four side lines of an image sensor. A first one of the yokes is disposed in parallel with a first one of the side lines of the image sensor in an optical axis direction. A second one of the yokes is disposed in parallel with a second one of the side lines of the image sensor in an optical axis direction, the second side line being adjacent to the first side line. A powering direction of the coil in a first one of the magnetic circuits is set opposite to that of the coil in a second one of the magnetic circuits with reference to the optical axis direction. Polarity of a first one of the magnets on the side of the image sensor is set opposite to that of a second of the magnets on the side of the image sensor. Thus, the image sensor is protected from magnetism.

It is technically known that flux density of the magnet is changeable with time or changes in ambient temperature. Even while a constant drive current flows through the coil, a value of the electro-magnetic force being generated may differ according to the ambient temperature or with time. Irregularity occurs in a moving speed of the lens driven by the electro-magnetic force upon occurrence of irregularity in the electro-magnetic force, so that the lens cannot be moved stably. The lens disclosed in U.S. Pat. No. 5,939,804 and JP-A 2011-123432 is the focus lens or the zooming lens (variator lens) in a lens driving method. Irregularity may occur in focusing or an adjustment speed for the magnification. Unfamiliar feeling in manipulation of a user is likely to occur.

While the coil is moved along the magnet in the optical axis direction to drive the lens, flux density of magnetism received from the magnet to the coil is characteristically smaller at end points of the magnet than at the center of the magnet in relation to the optical axis direction. In case a constant driving current flows through the coil, the electro-magnetic force generated by the magnet is smaller at its end points than at its center. Thus, the moving speed of the lens moving along the magnet with the coil becomes lower at the end points of the magnet than at its center. It may be possible to suppress changes in the moving speed of the lens by limiting a moving range of the coil to a main area of the magnet including the center. However, reduction of a size of the digital camera, video camera and the like has been focused in the industrial field. Assuming that the moving range of the coil is limited to the main area including the center of the magnet, areas at the end points are not utilized in a manner inconsistent to the idea of the size reduction. There is no known technique for stabilizing the moving speed of the lens in a structure where the moving range of the coil includes not only the center of the magnet but its end points.

SUMMARY OF THE INVENTION

In view of the foregoing problems, an object of the present invention is to provide a lens driving apparatus and method in which changes in a moving speed of a movable lens in a lens assembly are prevented to remove unfamiliar feeling in manipulation of a user.

In order to achieve the above and other objects and advantages of this invention, a lens driving apparatus for a lens supported in a lens holder movable in an optical axis direction is provided, and includes a voice coil motor, having a magnet extending in the optical axis direction, and a coil disposed in a magnetic field of the magnet and coupled to the lens holder, for generating electro-magnetic force by flow of a coil current, to move the lens holder together in the optical axis direction. A position detector detects a coil position of the coil relative to the magnet in the optical axis direction. A first table memory stores a first correction factor for compensating for a low level area in flux density distribution of the magnet in the optical axis direction in relation to respectively the coil position. An initial flux density memory stores initial flux density of the magnet set in a reference position. A flux density measurer measures monitored flux density of the magnet in the reference position. A flux density ratio determiner determines a flux density ratio between the initial flux density and the monitored flux density being measured by the flux density measurer. A factor modification unit modifies the first correction factor stored in the first table memory by use of the flux density ratio in relation to respectively the coil position. A controller corrects the coil current according to the first correction factor readout from the first table memory according to the coil position detected by the position detector.

Preferably, the flux density measurer measures the monitored flux density upon powering up.

According to a preferred embodiment of the present invention, the flux density measurer measures the monitored flux density at each time that a predetermined period elapses. Furthermore, a first update unit updates the first table memory for respectively the coil position according to a new value of the first correction modified by use of the flux density ratio.

Preferably, furthermore, an angle detector detects an elevation/depression angle of a lens barrel containing the lens holder. A second table memory stores a second correction factor for compensating for a low force area in the electro-magnetic force changeable according to a change in the elevation/depression angle in relation to respectively the elevation/depression angle. The controller corrects the coil current by use of the second correction factor read out from the second table memory according to the elevation/depression angle being detected by the angle detector.

Also, a lens driving method for a lens supported in a lens holder movable in an optical axis direction is provided, and includes a step of using a voice coil motor, having a magnet extending in the optical axis direction, and a coil disposed in a magnetic field of the magnet and coupled to the lens holder, for generating electro-magnetic force by flow of a coil current, to move the lens holder together in the optical axis direction. A coil position of the coil relative to the magnet in the optical axis direction is detected. A first correction factor is acquired from a first table memory according to the coil position being detected, the first table memory storing the first correction factor for compensating for a low level area in flux density distribution of the magnet in the optical axis direction in relation to respectively the coil position. Monitored flux density of the magnet is measured. A flux density ratio is determined between initial flux density of the magnet being stored and the monitored flux density being measured. The first correction factor is modified by use of the flux density ratio in relation to respectively the coil position. The coil current is corrected according to the first correction factor.

Preferably, furthermore, an elevation/depression angle of a lens barrel containing the lens holder is detected. A second correction factor is stored in a second table memory for compensating for a low force area in the electro-magnetic force changeable according to a change in the elevation/depression angle in relation to respectively the elevation/depression angle. In the current correcting step, the coil current is corrected by use of the second correction factor readout from the second table memory according to the elevation/depression angle being detected.

According to a preferred aspect of the present invention, furthermore, a temperature detector measures temperature at the magnet. A third table memory stores a third correction factor for compensating for a low level area in the flux density distribution changeable according to a change in the temperature in relation to respective temperature. The controller controls the coil current by use of the third correction factor read out from the third table memory according to the temperature measured by the temperature detector.

Preferably, furthermore, a clock device measures elapsed time. A fourth table memory stores a fourth correction factor for compensating for a low level area in the flux density distribution changeable with lapse of time in relation to respectively the elapsed time. The controller corrects the coil current by use of the fourth correction factor read out from the fourth table memory according to the elapsed time measured by the clock device.

Preferably, furthermore, a reference speed memory stores a reference moving speed of the coil upon a flow of a predetermined current through the coil for each one of plural sections defined by dividing a moving range of the coil. A moving time meter measures moving time of the coil for the respective sections by moving the coil in the moving range back and forthwith a current. A moving speed detector determines a monitored moving speed of the coil for the respective sections according to a length of the sections and the moving time. A speed ratio determiner determines a speed ratio between the reference moving speed and the monitored moving speed for the respective sections. A fifth table memory stores the speed ratio for the respective sections. The controller controls the coil current by use of the first correction factor read from the first table memory according to the coil position detected by the position detector and modified by use of the speed ratio read from the fifth table memory in relation to one of the sections including the coil position.

According to another preferred embodiment of the present invention, furthermore, a reference speed memory stores a reference moving speed of the coil upon a flow of a predetermined current through the coil for each one of plural sections defined by dividing a moving range of the coil. A moving time meter measures moving time of the coil for the respective sections by moving the coil in the moving range back and forthwith a current. A moving speed detector determines a monitored moving speed of the coil for the respective sections according to a length of the sections and the moving time. A speed ratio determiner determines a speed ratio between the reference moving speed and the monitored moving speed for the respective sections. A second update unit updates the first correction factor in the first table memory for the respective sections according to the speed ratio corresponding to one of the sections including the coil position detected by the position detector.

Preferably, the moving time meter measures the moving time by moving the coil back and forth upon powering up in relation to the respective sections.

Consequently, changes in a moving speed of a movable lens in a lens assembly are prevented to remove unfamiliar feeling in manipulation of a user, because a coil current through a coil in a voice coil motor can be corrected in consideration of a coil position.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

First Embodiment

Figure 1:
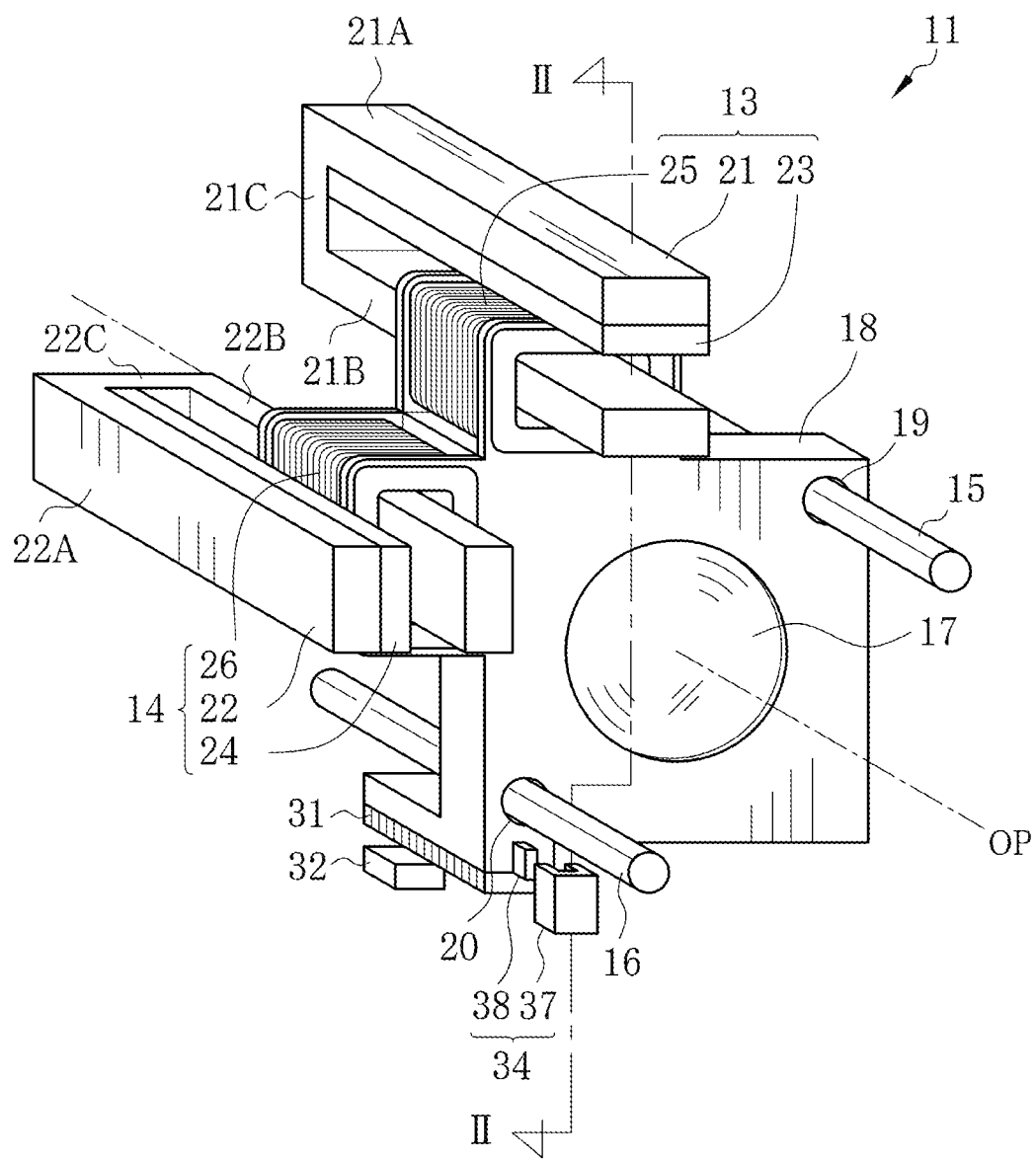
FIG. 1 is a perspective view illustrating a lens driving apparatus.
Figure 2:
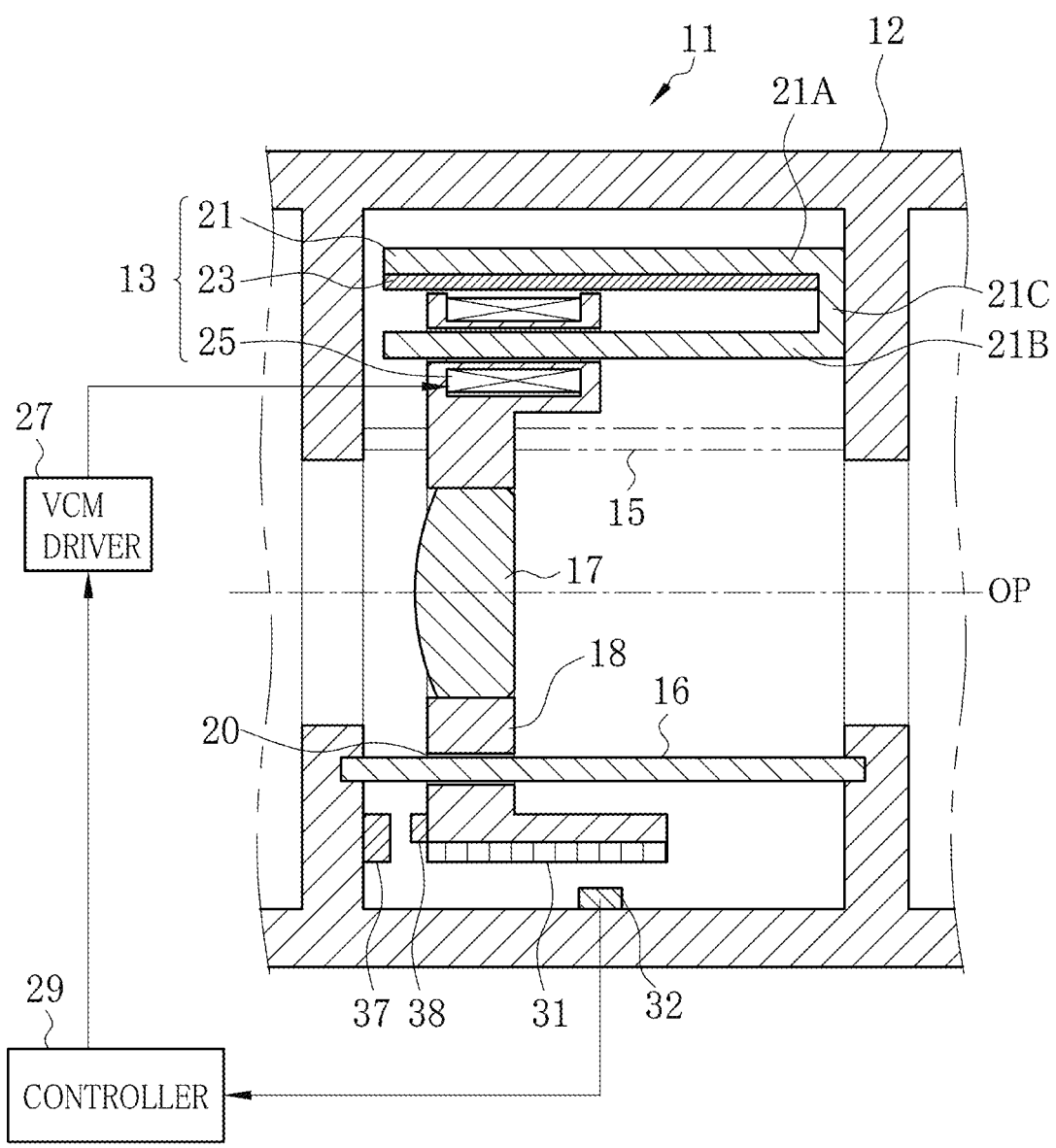
FIG. 2 is a vertical section taken on line II-II in FIG. 1.

In FIGS. 1 and 2, a lens driving apparatus 11 (lens assembly) of a first embodiment of the invention is incorporated in a digital camera or the like for photographing an object. The lens driving apparatus 11 includes a lens barrel 12 of FIG. 2 and first and second voice coil motors 13 and 14 (VCMs). The lens barrel 12 includes guide rods 15 and 16, a lens 17 and a lens holder 18. The guide rods 15 and 16 are disposed in parallel with an optical axis direction OP and arranged in a rotationally symmetric manner about the optical axis direction OP.

A plurality of lenses (lens optics) are contained in the lens barrel 12. Among those, the lens 17 of the embodiment is a focus lens for adjusting the focus of the camera. The lens 17 may be a zooming lens (variator lens) as a component in a zoom lens assembly. Guide holes 19 and 20 are formed through the lens holder 18 in the optical axis direction OP. The guide holes 19 and 20 are arranged at corners of the lens holder 18 in a rotationally symmetric manner with 180 degrees about the optical axis direction OP, and receive insertion of the guide rods 15 and 16. The lens holder 18 is kept movable in the optical axis direction OP, and prevented from rotationally shifting in a circumferential direction.

In FIG. 1, the first voice coil motor 13 is disposed on an upper side of the lens holder 18. The second voice coil motor 14 is disposed on a right side of the lens holder 18. The term of the upper side is used on a condition of directing a camera including the lens driving apparatus 11 to an object for photographing. The term of the right side is a side of a right hand of a user of the camera. In the present embodiment, the first and second voice coil motors 13 and 14 are used, and can move the lens stably even with a relatively large weight of the lens. The first voice coil motor 13 has a yoke 21, a magnet 23 and a coil 25. The second voice coil motor 14 has a yoke 22, a magnet 24 and a coil 26.

The yoke 21 is in a U shape, and includes an outer yoke plate 21A, an inner yoke plate 21B and a yoke support 21C (bend portion) between the inner and outer yoke plates 21A and 21B. The inner and outer yoke plates 21A and 21B extend in the optical axis direction. The magnet 23 is disposed on an inner surface of the outer yoke plate 21A, and extends in the optical axis direction. The yoke support 21C is attached to the lens barrel 12 to position the yoke 21 in the lens barrel 12. The yoke 21 functions to direct a magnetic flux of the magnet 23 from the outer yoke plate 21A toward the inner yoke plate 21B.

In the magnet 23, an S pole is assigned to a side of the outer yoke plate 21A of the yoke 21. An N pole is assigned to a side of the inner yoke plate 21B of the yoke 21. Preferable examples of the magnet 23 are a ferrite magnet, alnico magnet, samarium-cobalt magnet, neodymium magnet, and the like.

The coil 25 is attached to the upper side of the lens holder 18. The coil 25 is so positioned that the inner yoke plate 21B of the yoke 21 extends through an inner space in the coil 25. The lens driving apparatus 11 includes a flexible wiring board (not shown), a VCM driver 27 and a system controller 29 (controller). The VCM driver 27 is connected between the coil 25 and the controller 29 by the flexible wiring board, and supplies the coil 25 with a current. Electro-magnetic force is generated by the current from the VCM driver 27 to the coil 25 in the magnetic field of the magnet 23, and moves the coil 25 along the inner yoke plate 21B in the optical axis direction. The lens holder 18 is kept movable in the optical axis direction together with the coil 25.

Upon occurrence of flow of a current through the coil 25, the first voice coil motor 13 generates electro-magnetic force by use of the magnetic field and the current, namely, according to Fleming's left-hand rule. The direction of generating the electro-magnetic force is aligned with the optical axis direction, to move the coil 25 in the optical axis direction in a manner driven by the electro-magnetic force.

The yoke 22 of the second voice coil motor 14 is the same as the yoke 21 of the first voice coil motor 13, and includes an outer yoke plate 22A, an inner yoke plate 22B and a yoke support 22C (bend portion) to constitute a U shape. The magnet 24 is attached to a surface of the outer yoke plate 22A extending in the optical axis direction. The coil 26 is constructed in the same manner as the coil 25. The coil 26 is attached to a right side of the lens holder 18 and so positioned that the inner yoke plate 22B of the yoke 22 extends through an inner space of the coil 26. A VCM driver 28 is connected between the coil 26 and the controller 29 by a flexible wiring board. Also, the second voice coil motor 14 is the same as the first voice coil motor 13. The coil 26 is moved in the optical axis direction on the yoke 22 by means of electro-magnetic force generated in the optical axis direction upon a flow of a current through the coil 26 in the magnetic field of the magnet 24.

The moving speed of the coils 25 and 26 is determined according to electro-magnetic force and resistance force (braking force) of a predetermined level which depends on a weight of the lens and frictional resistance. To be precise, the coils 25 and 26 are accelerated assuming that the electro-magnetic force is higher than the resistance force, but decelerated assuming that the electro-magnetic force is lower than the resistance force, and are moved at a constant speed assuming that the electro-magnetic force is approximately equal to the resistance force. Let $I_0$ be a current. Let a strength of the magnetic field be constant. For the purpose of moving the coils 25 and 26 of a stopped state, the current $I_0$ is increased to set the electro-magnetic force higher than the resistance force. In contrast, for the purpose of stopping the coils 25 and 26 of a moving state, the current $I_0$ can be decreased to set the electro-magnetic force lower than the resistance force. For the purpose of keeping a constant speed of the coils 25 and 26, the current $I_0$ can be maintained constantly to set the electro-magnetic force equal to the resistance force.

In case the direction of the current flowing through the coils 25 and 26 is reversed, a direction of the electro-magnetic force is also reversed, to change a moving direction of the coils 25 and 26. Thus, the lens 17 can be movable back and forth in the optical axis direction together with the lens holder 18 by controlling the direction of the current to change the moving direction of the coils 25 and 26.

A multi-pole magnetized magnet 31 and a magnetoresistive sensor 32 (MR sensor) are used to detect a coil position P of the coils 25 and 26 relative to the magnets 23 and 24. The multi-pole magnetized magnet 31 is attached to the lens holder 18. The magnetoresistive sensor 32 is attached to an inner wall of the lens barrel 12 and opposed to the multi-pole magnetized magnet 31. The multi-pole magnetized magnet 31 is magnetized with a pattern in which N and S poles are arranged alternately with one another in the optical axis direction. A width of the pattern of the magnetization is 100 microns or so. The magnetoresistive sensor 32 is constituted by any one of various types of magnetoresistive elements (MR elements) of which electrical resistance is changed according to strength of the magnetic field.

The magnetoresistive sensor 32 outputs a pulse signal or a periodically changing electric signal to the controller 29, the pulse signal being according to a pattern of alternately arranging N and S poles of the multi-pole magnetized magnet 31. The controller 29 detects the coil position P according to the output of the magnetoresistive sensor 32. It is possible to use a potentiometer, encoder or the like besides the magnetoresistive sensor 32, and detect the coil position P by inputting a signal therefrom to the controller 29.

Figure 3:
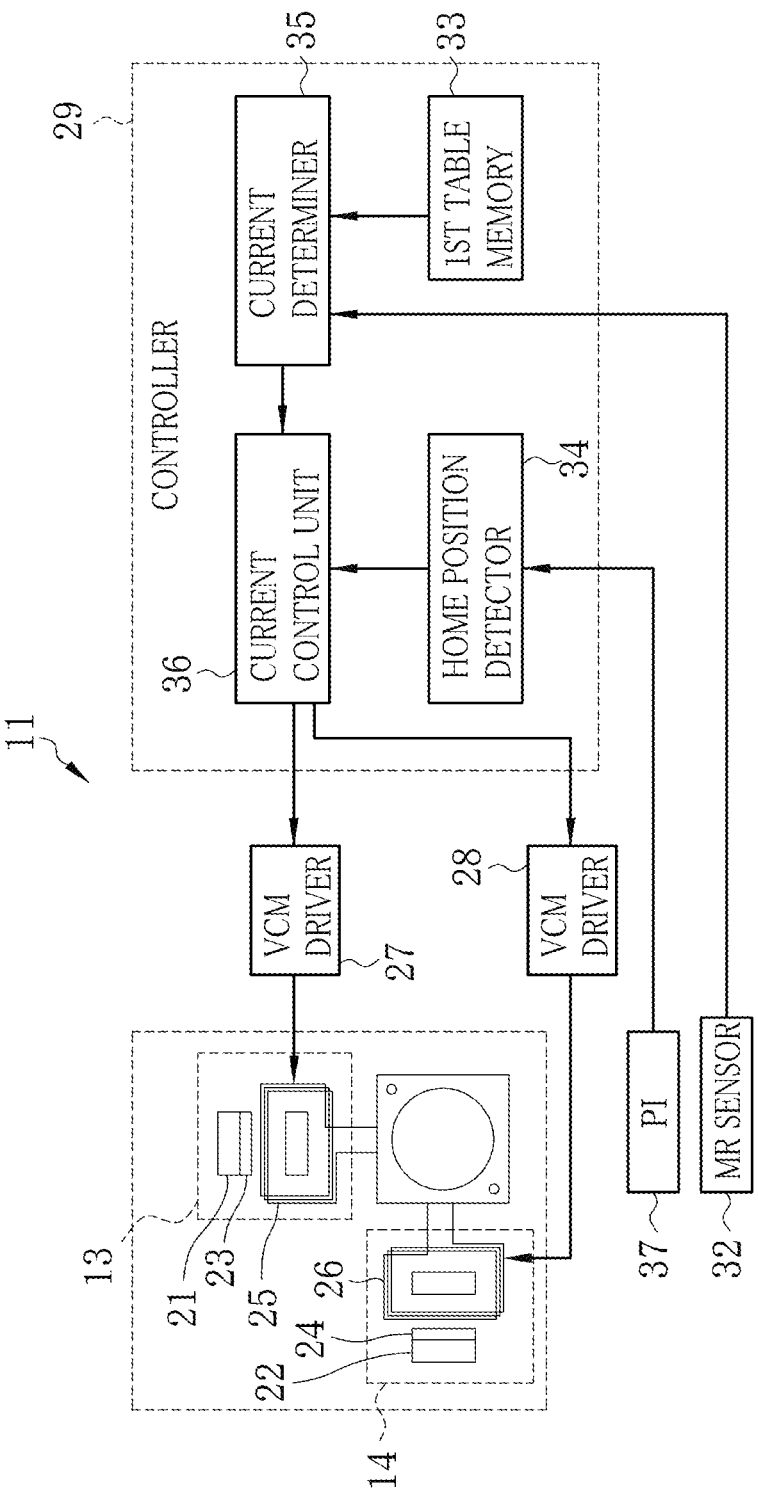
FIG. 3 is a block diagram schematically illustrating the lens driving apparatus.

In FIG. 3, the controller 29 includes a first table memory (flux density), a home position detector 34, a current determiner 35 (offset correction unit) and a current control unit 36. The controller 29 also has various elements required for the digital camera, such as a user input interface, CPU, image processor, memory, display panel, A/D converter and the like. The user input interface includes a power button, release button, zoom button and the like operable manually. The controller 29 controls turning on and off of a power source of the digital camera, exposure control and focusing prior to photographing, and zooming, photographing and the like in response to inputs from the user input interface. The CPU controls an image sensor such as a CMOS, CCD or the like according to a predetermined control program. Thus, an object image focused on an imaging surface by the lens 17 is converted photoelectrically by pixels, and output to a memory or the like. The image processor processes the output image from the image sensor in image processing of various functions, such as A/D conversion, white balance correction, gamma correction and the like. Also, the controller 29 writes the processed image to a storage medium, such as a memory, removable media card and the like, or drives the display panel to display the processed image.

Figure 4:
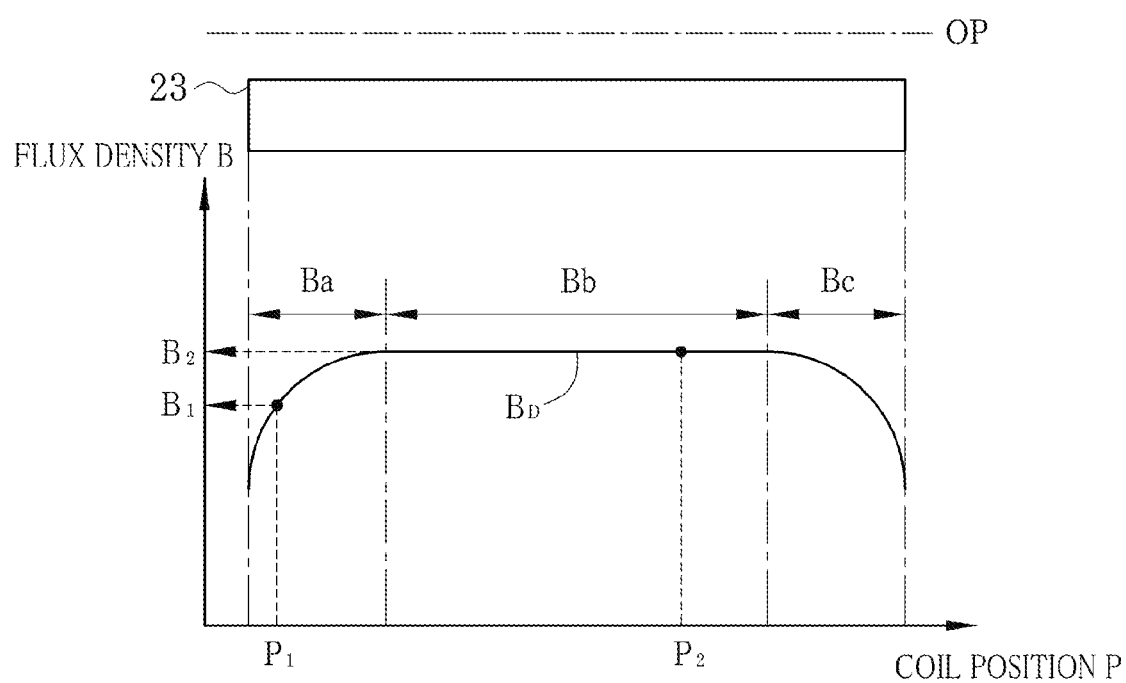
FIG. 4 is a graph illustrating a relationship between a coil position and flux density.

The first table memory 33 stores a relationship between the coil position P of the coils 25 and 26 and the first correction factor C1. The first correction factor C1 is used to correct the current through the coils 25 and 26 for each coil position P according to the flux density distribution BD of the flux density B of the magnets 23 and 24 in the optical axis direction. In FIG. 4, the flux density distribution BD has low level areas Ba and Bc and a normal area Bb. In the low level areas Ba and Bc, the flux density B decreases (offsets) toward ends of the magnet 23 in the optical axis direction. In the normal area Bb, the flux density B is approximately constant with small changes in the flux density B. In the present embodiment, the low level area Ba is located on the back side of the camera. The low level area Bc is located on the front side of the object. The flux density distribution BD is distribution of the flux density B measured for each coil position P, for example, under a predetermined condition in the manufacture, the condition including information of a horizontal state, 25 degrees Celsius, 5 V, 500 mA, 0.1 second and the like. Assuming that the magnet is exchanged for repair, maintenance or the like, the flux density distribution is obtained by measuring the magnet after the repair.

A condition of flux density $B_1$<flux density $B_2$ is obtained by comparison of the flux density $B_1$ in a coil position $P_1$ in the low level area Ba of the flux density distribution BD and the flux density $B_2$ in a coil position $P_2$ in the normal area Bb. While the current $I_0$ is maintained constantly in the movement of the coil past the coil positions $P_1$ and $P_2$, a relationship between the electro-magnetic force $F_1$ generated in the coil position $P_1$ and the electro-magnetic force $F_2$ generated in the coil position $P_2$ is the electro-magnetic force $F_1$<the electro-magnetic force $F_2$ in a manner similar to the relationship between the flux densities $B_1$ and $B_2$. Consequently, the resistance force (braking force) is not equal to the electro-magnetic force F as values of the electro-magnetic force F are different between the coil positions P. The lens 17 driven with the electro-magnetic force F is moved not at a regular speed.

Figure 5:
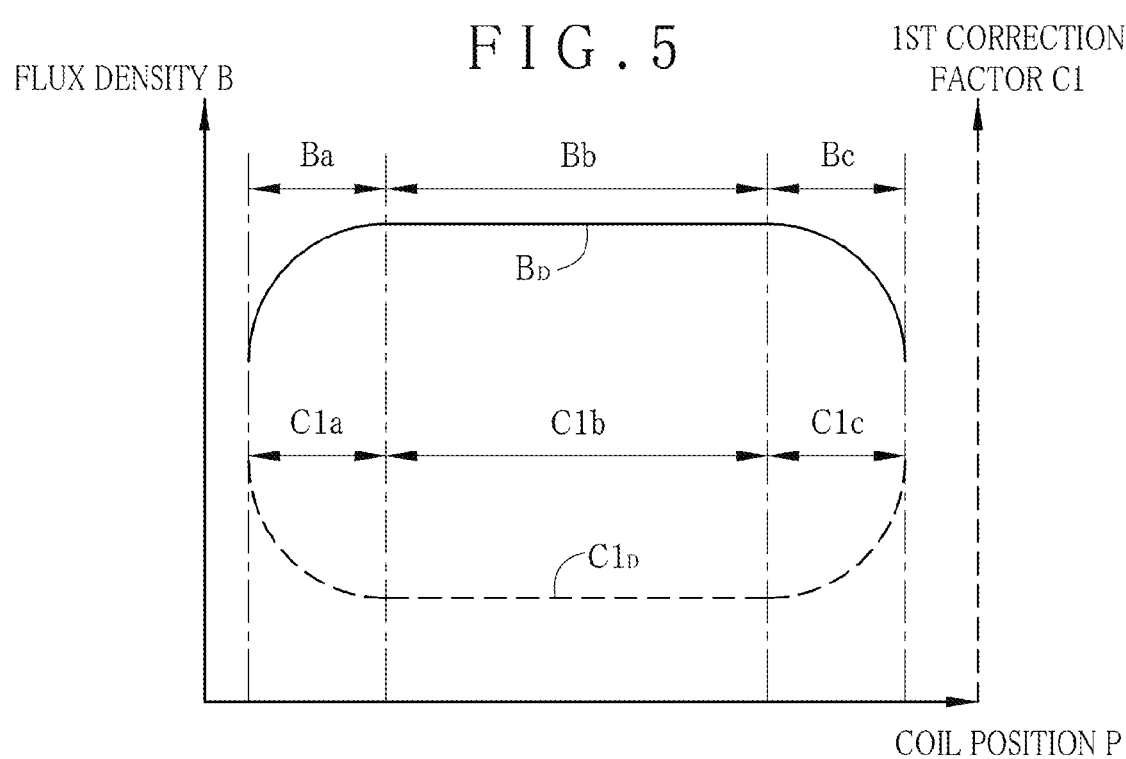
FIG. 5 is a graph illustrating a relationship between the flux density and a first correction factor for each coil position.

In FIG. 5, the current $I_0$ is corrected by use of the first correction factor C1 to maintain a moving speed constantly even with instability in the flux density B. Distribution $C1_D$ of the first correction factor corresponds to the flux density distribution BD. For example, the normal area Bb with uniform distribution of the flux density B is assigned with a normal area C1b with uniform distribution of the first correction factor C1. The low level area Ba with a decrease (offset) in the flux density in the backward direction is assigned with a high level area C1a with an increase of the first correction factor C1. The low level area Bc with a decrease (offset) in the flux density in the forward direction is assigned with a high level area C1c with an increase of the first correction factor C1. The current $I_0$ is corrected with the first correction factor C1 not only in case the flux density B is constant but in case the flux density B is unstable.

In FIGS. 2 and 3, the home position detector 34 includes a photo interrupter 37 (PI) and an optical indicia 38 (index). The photo interrupter 37 is disposed inside the lens barrel 12 on an object side. The optical indicia 38 is disposed on the lens holder 18, and movable into and out of a groove in the photo interrupter 37 upon movement of the lens holder 18. In the home position detector 34, the optical indicia 38 moving with the lens holder 18 is detected by the photo interrupter 37, to check setting of the lens holder 18 in the home position $P_0$. The information of the home position $P_0$ detected by the home position detector 34 is input to the current control unit 36. Note that a position sensor other than the photo interrupter 37 can be used to check setting of the lens holder 18 in the home position $P_0$, for example, a micro switch.

The current determiner 35 corrects the current $I_0$ according to the first correction factor C1 for the detected coil position P, to obtain a corrected current $I_0 \times C1$. At first, information of the coil position P is input from the magnetoresistive sensor 32. The first correction factor C1 is read from the first table memory 33 according to the coil position P. The current $I_0$ is corrected by use of the first correction factor C1. Values of the corrected current $I_0 \times C1$ are obtained for respectively coil positions P. Therefore, distribution of the corrected current $I_0 \times C1$ corresponds to the first correction factor distribution $C1_D$. The corrected current $I_0 \times C1$ is constant in the normal area C1b but increases in the high level areas C1a and C1c. The electro-magnetic force F can be maintained constantly by correcting the current $I_0$ with the first correction factor C1 even upon changes in the magnetic field or changes in the flux density B for the coil positions P. Information of the corrected current $I_0 \times C1$ from the current determiner 35 is input to the current control unit 36.

The current control unit 36 in connection with the VCM drivers 27 and 28 checks whether a current should flow through the coils 25 and 26 and controls reversing of a direction of the flow of the current. The current control unit 36 causes the corrected current to flow through the coils 25 and 26 according to information of the corrected current being input. In case the coils 25 and 26 reach a target position, for example, in-focus position, then the corrected current is turned off.

In case the power button is depressed, the current control unit 36 detects powering, and controls the current $I_0$ to flow through the coils 25 and 26 by use of the VCM drivers 27 and 28. Upon receiving an input of information of the home position $P_0$ from the home position detector 34, the current control unit 36 turns off the current $I_0$ in the home position $P_0$, to stop the lens holder 18 in the home position $P_0$. Thus, a position of the lens holder 18 immediately upon powering up can be set again. Note that the current $I_0$ flows through the coils 25 and 26. However, a corrected current can be caused to flow through the coils 25 and 26 for the position of the lens holder 18 upon powering up. In case the power button is depressed again for turning off, it is possible to return the coils 25 and 26 to the home position $P_0$ from a given coil position P before turning off the power source.

Figure 6:
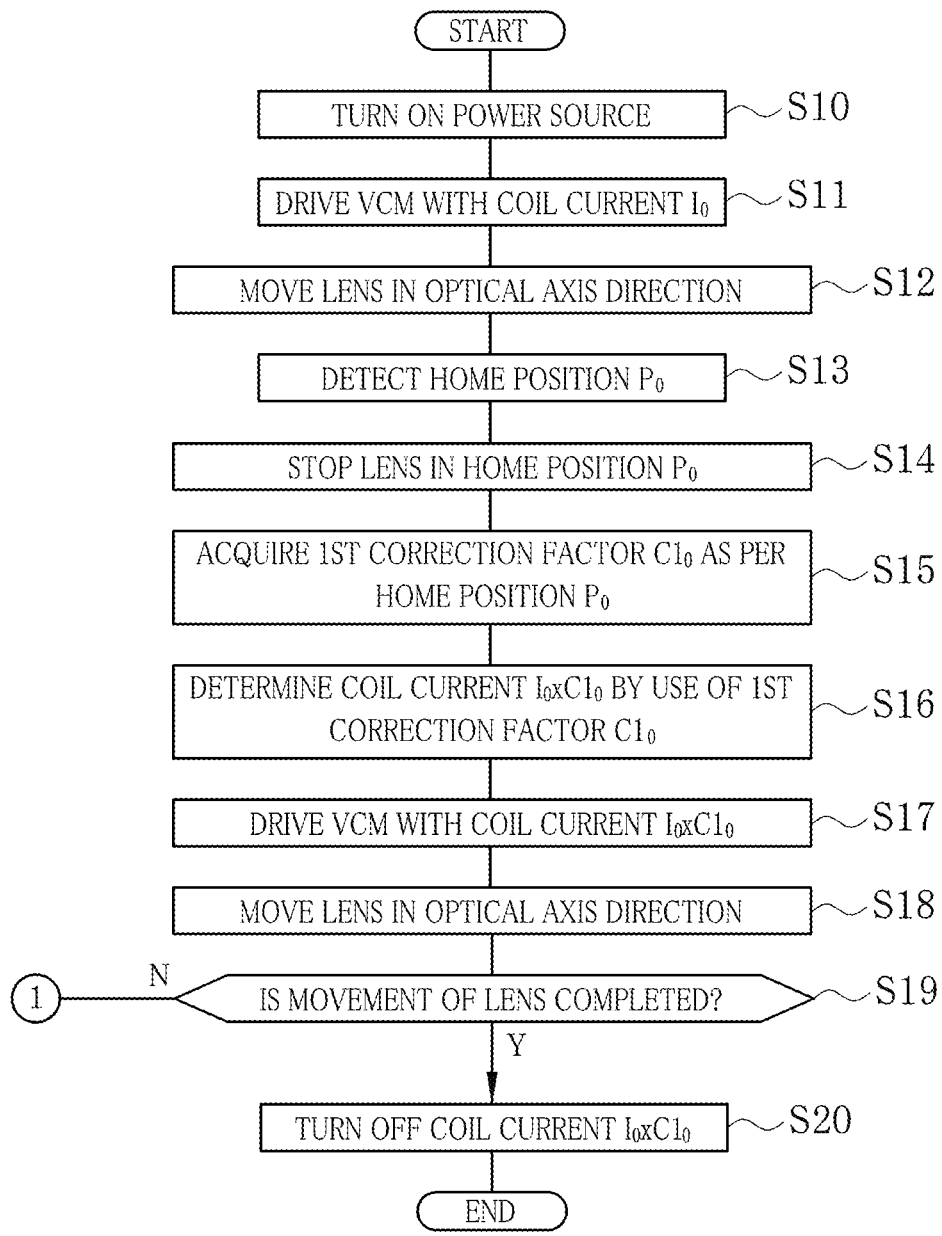
FIG. 6 is a flow chart illustrating steps at the beginning of driving the lens.
Figure 7:
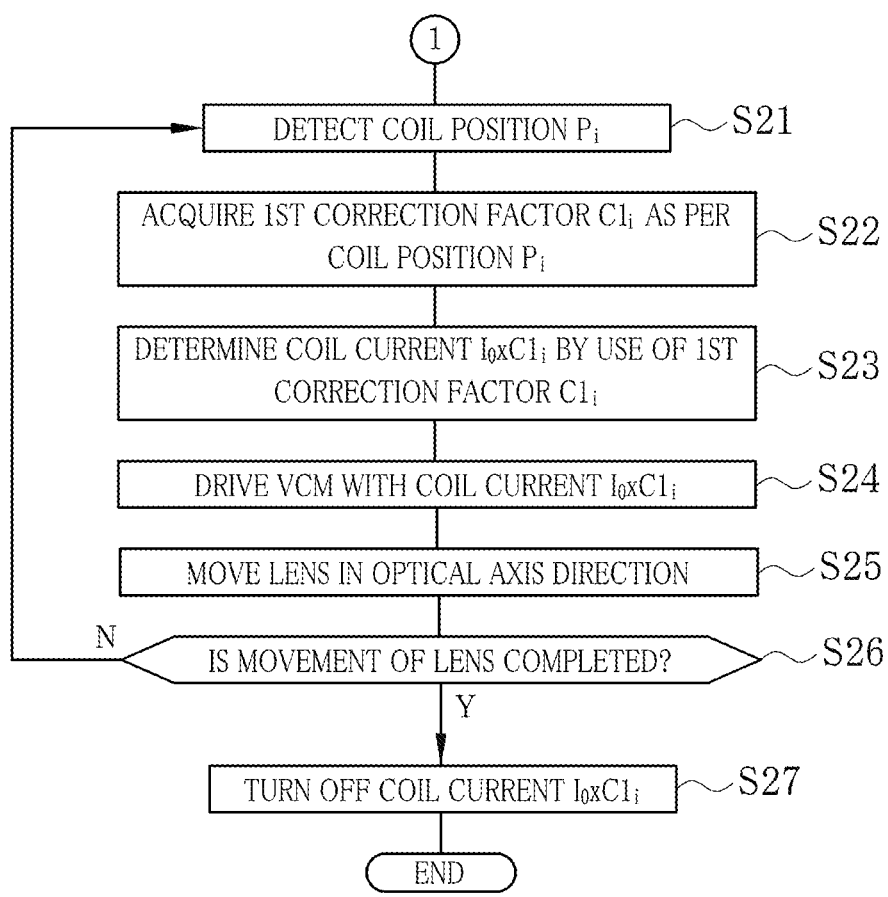
FIG. 7 is a flow chart illustrating remaining steps of driving the lens.

The operation of the first embodiment is described now by referring to the flow charts of FIGS. 6 and 7. At first, the power source of the digital camera is turned on by depressing the power button in the step S10. The coils 25 and 26 are supplied with the current $I_0$ by the VCM drivers 27 and 28 in the step S11. The lens 17 is moved together with the coils 25 and 26 in the optical axis direction in the step S12. The photo interrupter 37 detects setting of the lens 17 in the home position $P_0$ in the step S13. Supply of the current $I_0$ to the coils 25 and 26 is turned off in the home position $P_0$. The lens 17 is stopped in the step S14.

A first correction factor $C1_0$ corresponding to the home position $P_0$ where the lens 17 is stopped is acquired from the first table memory 33 in the step S15. A corrected current $I_0 \times C1_0$ is determined by correcting the current $I_0$ with the first correction factor $C1_0$ in the step S16. The corrected current $I_0 \times C1_0$ is caused to flow through the coils 25 and 26 by the VCM drivers 27 and 28 in the step S17. Thus, the lens 17 moves together with the coils 25 and 26 in the step S18. Assuming that the movement of the lens 17 is completed (yes in the step S19), the corrected current $I_0 \times C1_0$ is turned off in the step S20.

Assuming that the movement of the lens 17 is not completed (no in the step S19), the coil position $P_i$ is detected in the step S21. The first correction factor $C1_i$ corresponding to the detected coil position $P_i$ is acquired from the first table memory 33 in the step S22. A corrected current $I_0 \times C1_i$ is determined by correcting the current $I_0$ with the first correction factor $C1_i$ in the step S23. The corrected current $I_0 \times C1_i$ is caused to flow through the coils 25 and 26 by the VCM drivers 27 and 28 in the step S24. Thus, the lens 17 moves together with the coils 25 and 26 in the step S25. Assuming that the movement of the lens 17 is completed (yes in the step S26), the corrected current $I_0 \times C1_i$ is turned off in the step S27. Assuming that the movement of the lens 17 is not completed (no in the step S26), the steps S21-S26 are repeated until completion of the movement of the lens 17.

In the first embodiment, the current $I_0$ is corrected with the first correction factor C1 for each coil position P stored in the first table memory 33, to regulate the electro-magnetic force F generated for each one of the coil positions P. Changes in the speed of moving the lens 17 driven by the electromagnetic force F can be suppressed. Changes in the speed of the movement of the lens 17 which is a focus lens or zooming lens (variator lens) are suppressed to remove unfamiliar feeling in manipulation of a user in relation to changes in the moving speed of the lens for focusing or changing the magnification. Although the lens 17 must be stopped in compliance with a moving speed with irregularity, it is possible in the invention to stop the lens 17 always in the same manner, because the moving speed of the lens 17 can be constant. The first correction factor C1 corresponds to irregularity of the flux density of the magnets 23 and 24 in the optical axis direction. The moving speed of the lens 17 can be constant even at end portions of the magnets 23 and 24 which do not have stability in the flux density. It follows that the lens can be driven not only at the center of the magnets 23 and 24 but also at their end portions. The size of the entirety of the apparatus can be reduced.

In the present embodiment, the corrected current is obtained by multiplication between the current $I_0$ and the first correction factor C1. However, a corrected current can be obtained by other methods of calculation to correct the current according to a change in the flux density.

Second Embodiment

Figure 8:
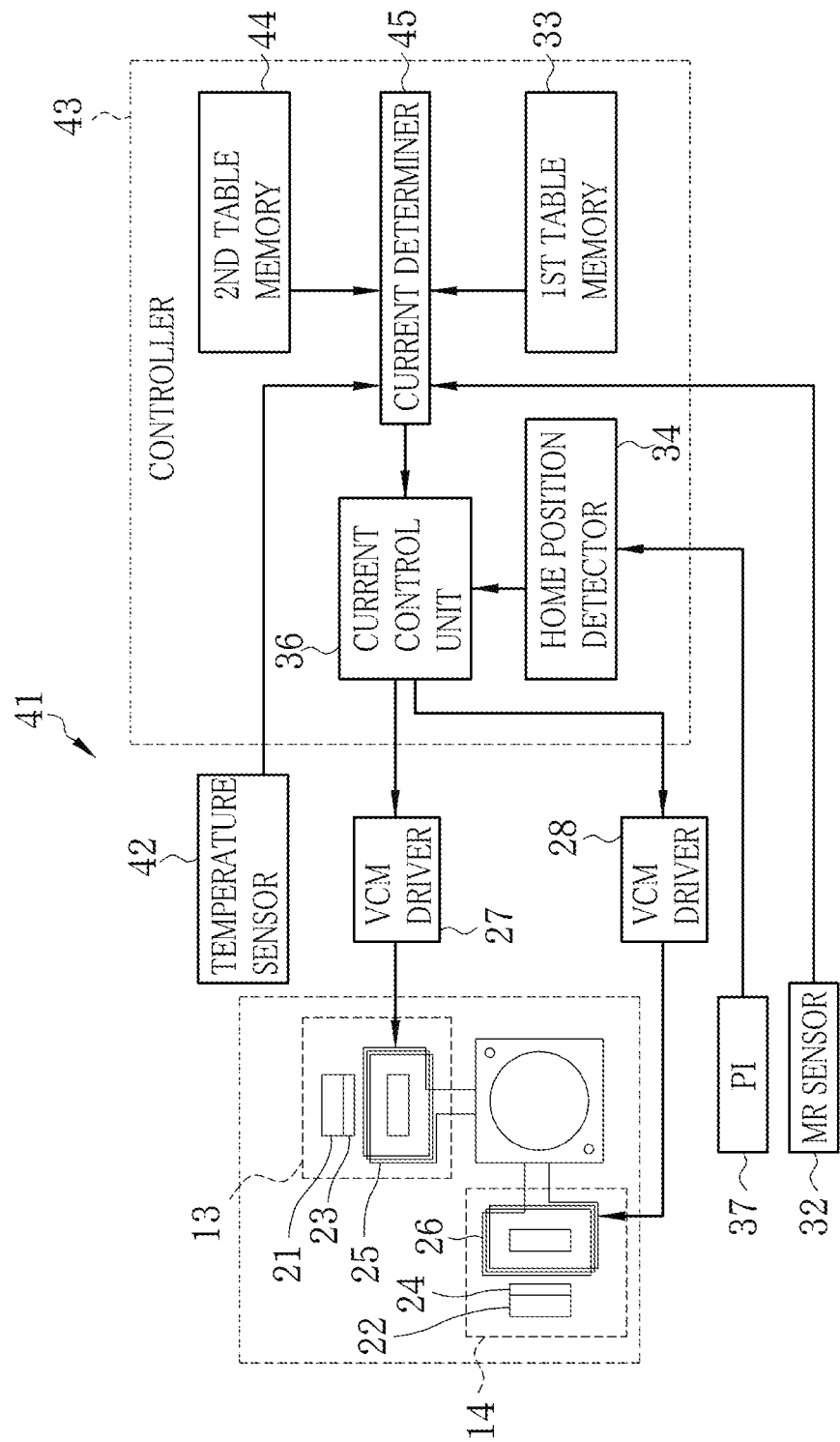
FIG. 8 is a block diagram schematically illustrating a second preferred lens driving apparatus.

In FIG. 8, a second preferred lens driving apparatus 41 (lens assembly) is illustrated, and includes a temperature sensor 42 (temperature detector). A current is corrected by use of the first correction factor C1 and further corrected by use of a second correction factor C2. The temperature sensor 42 detects ambient temperature T around the magnets 23 and 24. The current is corrected by use of the second correction factor C2 corresponding to the detected temperature T. For the lens driving apparatus 41, the lens driving apparatus 11 is repeated but with a difference in having a system controller 43 (controller) and the temperature sensor 42. Elements similar to those of the above embodiments are designated with identical reference numerals.

An example of the temperature sensor 42 is a thermistor disposed inside the lens barrel 12, and detects the ambient temperature T around the magnets 23 and 24 to detect the temperature T of surfaces of the magnets 23 and 24 indirectly. Also, the temperature sensor 42 may be disposed in contact with the magnets 23 and 24 to detect their surface temperature. The temperature sensor 42 is connected to the controller 43, and inputs information of the detected temperature T to the controller 43.

The controller 43 includes a second table memory 44 (temperature) and a current determiner 45 (offset correction unit). The controller 29 is repeated but with a difference in having the second table memory 44 and the current determiner 45.

Figure 9:
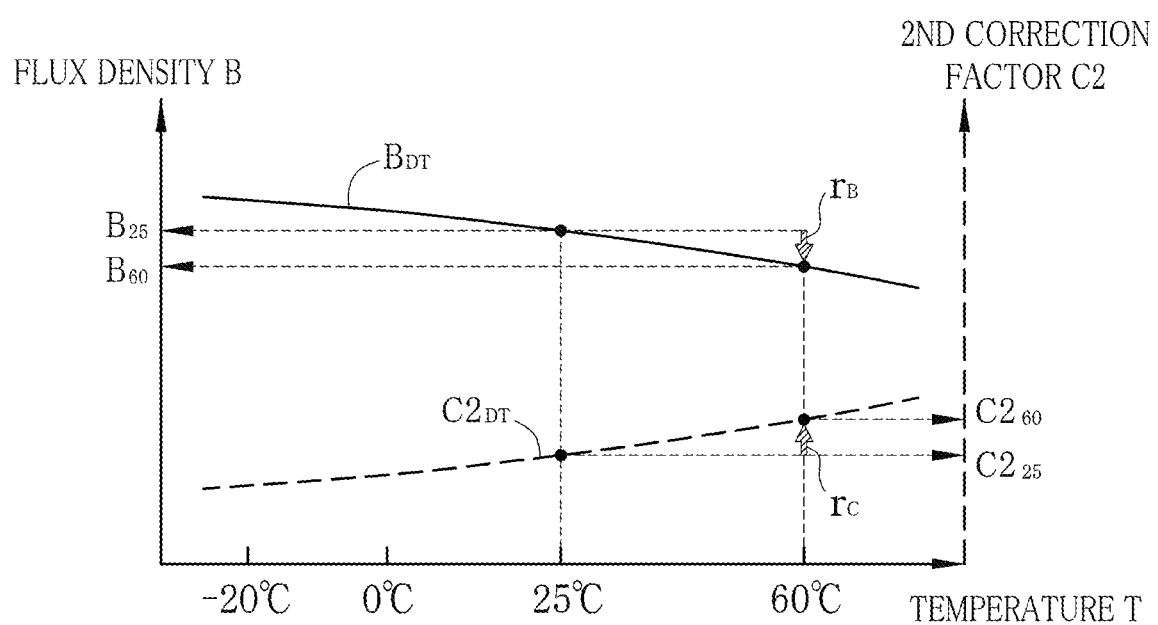
FIG. 9 is a graph illustrating a relationship between the flux density and a second correction factor for each value of temperature.

In FIG. 9, the second table memory 44 stores a relationship between the temperature T and the second correction factor C2 in a manner preset at the time of manufacture. The second correction factor C2 is used to correct the current according to the detected temperature T based on the flux density distribution $BD_T$ changeable according to changes in the temperature T. The flux density distribution $BD_T$ is distribution according to a temperature characteristic of the magnet of which the flux density B decreases according to an increase in the temperature T and increases according to a decrease in the temperature T. The electro-magnetic force F changes with changes in the temperature T upon flow of a current through the coils 25 and 26, because the flux density B changes with changes in the temperature T. A moving speed of the coils 25 and 26 driven with the electro-magnetic force F is changed by changes in the temperature T.

The second correction factor C2 is used to correct the current for the respective temperature T to set the electromagnetic force F constantly for moving the coils 25 and 26 even with changes in the temperature T. The distribution $C2_{DT}$ of the second correction factor for the temperature T decreases at a ratio $r_B$ ($=B_{60}/B_{25}$) of the flux density B from flux density $B_{25}$ to flux density $B_{60}$ upon a change from a reference temperature of 25 degrees Celsius to the temperature of 60 degrees Celsius. In contrast, the second correction factor C2 is determined to increase at a ratio $r_C$ ($=C2_{60}/C2_{25}$) of a change from a second correction factor $C2_{25}$ to a second correction factor $C2_{60}$. Note that the ratios $r_B$ and $r_C$ are ratios of an equal value having increasing and decreasing changes opposite to one another.

In FIG. 9, the ratios $r_B$ and $r_C$ are indicated as vectors with arrows of thick lines. Also, ratios $r_B$, $r_C$ and $r_v$ of embodiments of FIGS. 13, 17, 18, 28 and 29 are indicated as vectors with arrows of thick lines. The relationship of the second correction factor C2 is indicated in a practical range of the temperature T, for example, a level equal to or higher than −20 degrees Celsius and equal to or lower than 60 degrees Celsius. However, the second correction factor C2 can be set in other ranges of the temperature T according to various conditions, such as actual environment of the digital camera.

In FIG. 8, the current determiner 45 obtains a current $I_0 \times C1 \times C2$ by correcting a current $I_0$ by use of a first correction factor C1 corresponding to the detected coil position P and the second correction factor C2 corresponding to the detected temperature T. In case information of the coil position P is input from the magnetoresistive sensor 32, the first correction factor C1 is read from the first table memory 33 according to the coil position P. In case information of the temperature T is input from the temperature sensor 42, the second correction factor C2 is read from the second table memory 44 according to the temperature T. Then the current $I_0$ is corrected by use of the first and second correction factors C1 and C2. The corrected current $I_0 \times C1 \times C2$ is obtained for the respective coil position P and the respective temperature T. Consequently, the electro-magnetic force F can be kept constant by correcting the current $I_0$ according to the first and second correction factors C1 and C2 even upon changes in the flux density with changes in the temperature. Information of the corrected current $I_0 \times C1 \times C2$ from the current determiner 45 is input to the current control unit 36.

Figure 10:
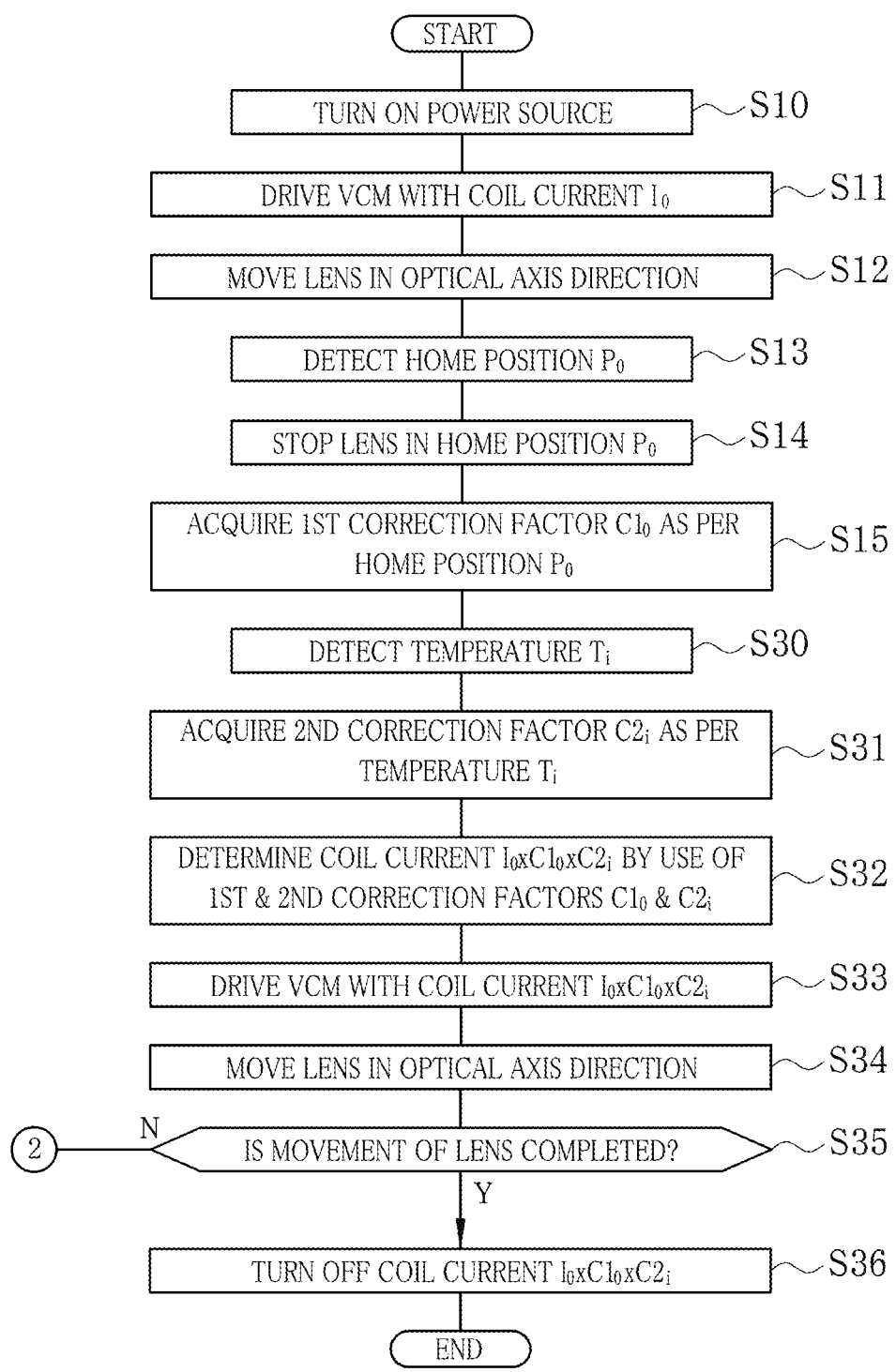
FIG. 10 is a flowchart illustrating steps at the beginning of driving the lens.
Figure 11:
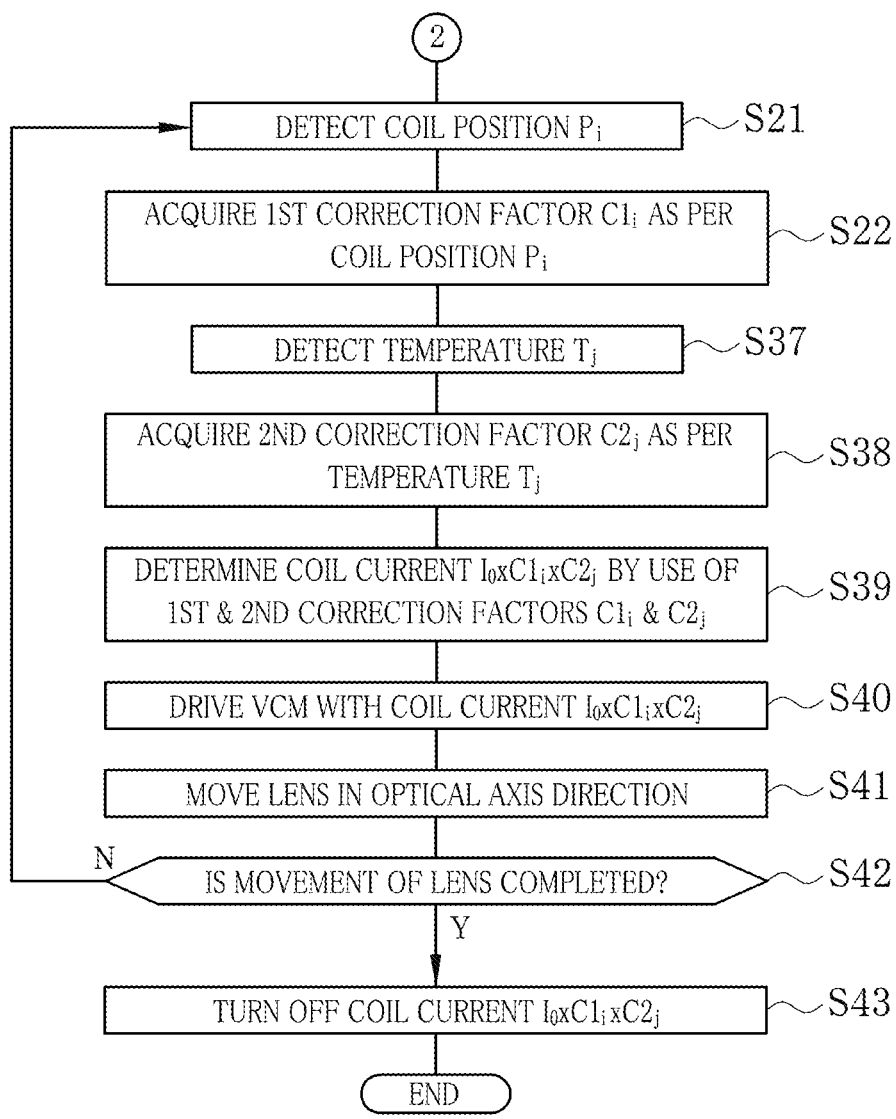
FIG. 11 is a flow chart illustrating remaining steps of driving the lens.

The operation of the second embodiment is described next by referring to the flow charts of FIGS. 10 and 11. At first, the power source of the camera is turned on in a manner similar to the first embodiment. The coils 25 and 26 are supplied with the current $I_0$ to move the lens 17 in the optical axis direction. The lens 17 is stopped in the home position $P_0$. A first correction factor $C1_0$ in the home position $P_0$ is acquired from the first table memory 33 in the steps S10-S15.

Then the temperature $T_i$ is detected in the step S30. A second correction factor $C2_i$ is acquired from the second table memory 44 according to the detected temperature $T_i$ in the step S31. A corrected current $I_0 \times C1_0 \times C2_i$ is determined by correcting the current $I_0$ with the first and second correction factors $C1_0$ and $C2_i$ in the step S32. The corrected current $I_0 \times C1_0 \times C2_1$ is caused to flow through the coils 25 and 26 by the VCM drivers 27 and 28 in the step S33. The lens 17 is moved together with the coils 25 and 26 by the corrected current $I_0 \times C1_0 \times C2_i$ in the step S34. Assuming that movement of the lens 17 is completed (yes in the step S35), the corrected current $I_0 \times C1_0 \times C2_i$ is turned off in the step S36.

Assuming that the movement of the lens 17 is not completed (not in the step S35), the coil position $P_i$ is detected. A first correction factor $C1_i$ is acquired from the first table memory 33 according to the coil position $P_i$ in the steps S21 and S22. Then the temperature $T_j$ is detected in the step S37. A second correction factor $C2_j$ is acquired from the second table memory 44 according to the detected temperature $T_j$ in the step S38. The current $I_0$ is corrected by use of the first correction factor $C1_i$ being acquired and the second correction factor $C2_j$, to determine the corrected current $I_0 \times C1_i \times C2_j$ in the step S39. The corrected current $I_0 \times C1_i \times C2_j$ is caused to flow through the coils 25 and 26 by the VCM drivers 27 and 28 in the step S40. The lens 17 is moved together with the coils 25 and 26 by means of the corrected current $I_0 \times C1_i \times C2_j$ in the step S41. Assuming that the movement of the lens 17 is completed (yes in the step S42), the corrected current $I_0 \times C1_i \times C2_j$ is turned off in the step S43. Assuming that the movement of the lens 17 is not completed (no in the step S42), the steps S21-S42 are repeated until the movement of the lens 17 is completed.

In the second embodiment, the second correction factor C2 for the respective temperature T stored in the second table memory 44 is used in addition to the first correction factor C1 for the respective coil position P stored in the first table memory 33, so that the current is further corrected to maintain the electro-magnetic force F constantly. Changes in the speed in moving the lens 17 can be suppressed even upon an abrupt change in the temperature T by moving the digital camera with the lens driving apparatus 41 from the inside to the outside of a room, or even upon an increase in the temperature T of the magnets 23 and 24 with heat generated by continuous driving of the lens driving apparatus 41.

In the second embodiment, the temperature T is always measured. Alternatively, it is possible to measure the temperature T upon manual depression of a measuring button (not shown) for starting measurement of the temperature T. Furthermore, the temperature can be measured upon lapse of a constant period. To this end, a timer (not shown) is used for predetermining the period for measuring the temperature T. Thus, load to the apparatus can be reduced by the periodical measurement of the temperature T in comparison with the structure for measuring the same always. Also, the temperature T measured periodically can be approximated by linear approximation or the like, to estimate changes in the temperature T. The current can be corrected according to the estimated temperature T.

Third Embodiment

Figure 12:
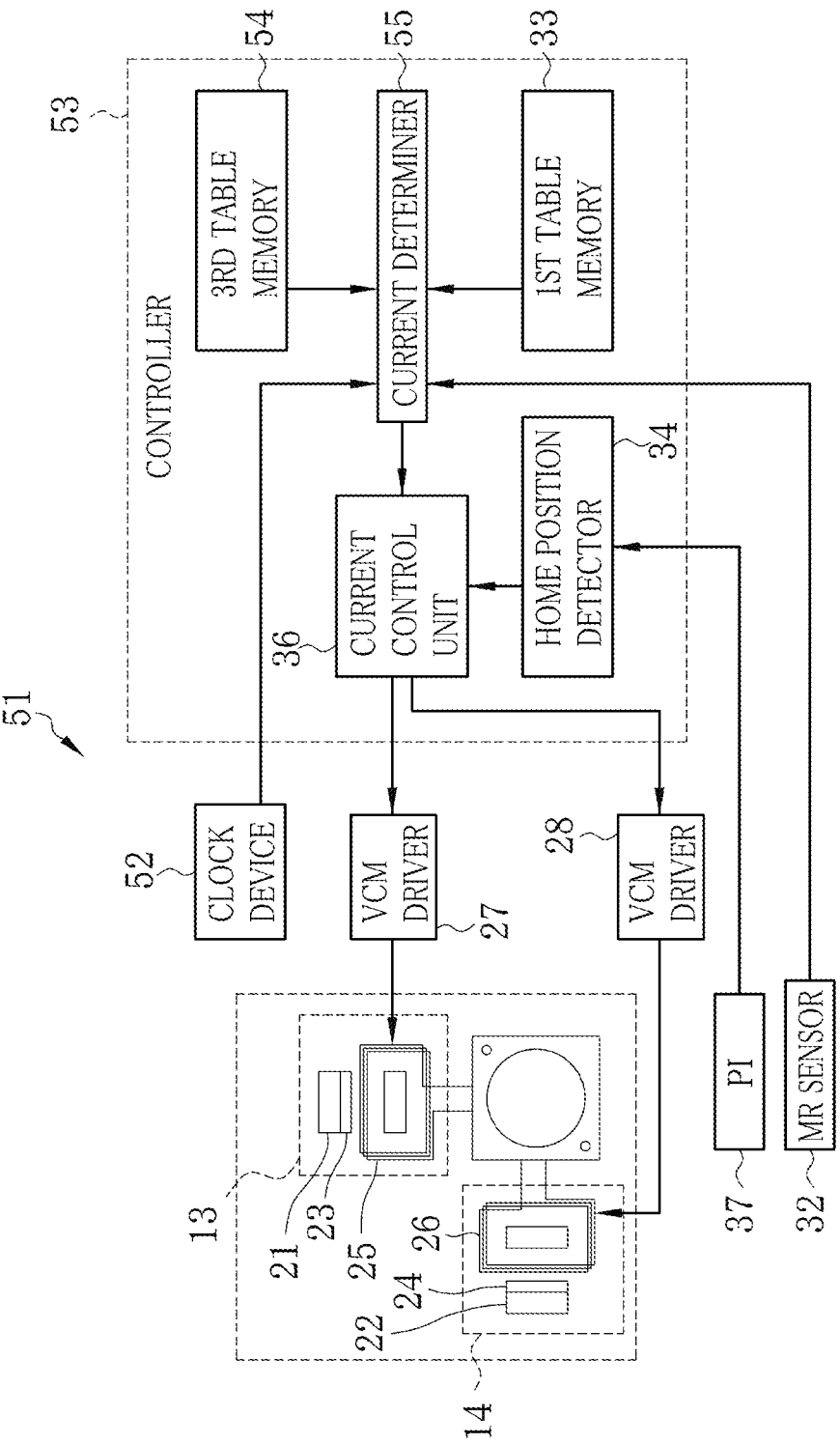
FIG. 12 is a block diagram schematically illustrating a third preferred lens driving apparatus.

In FIG. 12, a third preferred lens driving apparatus 51 (lens assembly) includes a clock device 52 (elapsed time meter) for measuring elapsed time. A third correction factor C3 according to the elapsed time is used to correct the current. In the lens driving apparatus 51, the lens driving apparatus 11 is repeated but with a difference of having the clock device 52 and a system controller 53 (controller). Elements similar to those of the above embodiments are designated with identical reference numerals.

The clock device 52 measures elapsed time t from a reference time point of having measured the flux density distribution BD of the magnets 23 and 24. An example of the reference time point is a time point of having measured the flux density distribution BD of the magnets 23 and 24 in a condition predetermined in the manufacture. Assuming that the magnet is exchanged for repair or other purposes, the reference time point is a time point of measuring the flux density distribution BD again after the repair. The clock device 52 is connected to the controller 53, to which information of the measured elapsed time t is input. It is possible to determine a time point of measuring the elapsed time t in various manners, for example, a time point of turning on a power source of the camera, or per unit time of plural days, plural months or plural years. In the present embodiment, the clock device 52 is separate from the controller 53. However, the clock device 52 may be constituted by the controller 53.

The controller 53 includes a third table memory 54 (time) and a current determiner 55 (offset correction unit). In the controller 53, the controller 29 is repeated but with a difference in the third table memory 54 and the current determiner 55.

Figure 13:
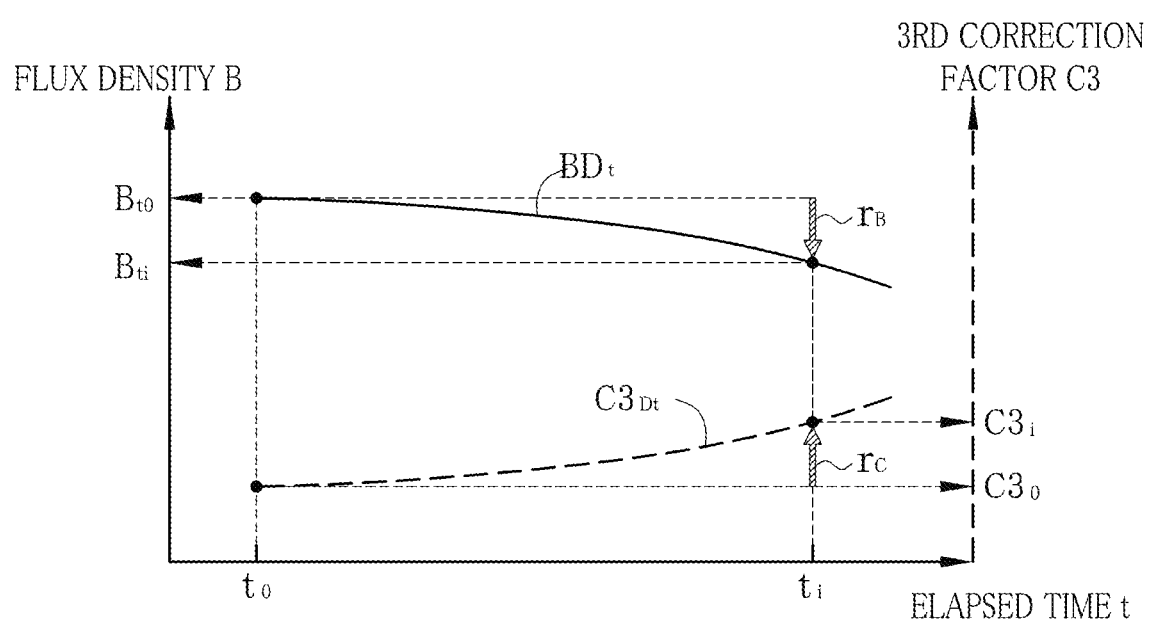
FIG. 13 is a graph illustrating a relationship between a flux density and a third correction factor.

The third table memory 54 stores a relationship between the elapsed time t and a third correction factor C3. In FIG. 13, the third correction factor C3 is used for correcting a current through the coils 25 and 26 upon the lapse of the elapsed time t according to the flux density distribution $BD_t$ of the magnets 23 and 24 changing according to the lapse of time. There is tendency of a decrease in the flux density of the magnets 23 and 24 according to the lapse of time. Thus, the electro-magnetic force F generated in the coils 25 and 26 decreases with time while a current $I_0$ flows through the coils 25 and 26. A moving speed of the coils 25 and 26 driven with electro-magnetic force F decreases according to the lapse of time.

The third correction factor C3 is used for correcting the current for respectively the elapsed time t so as to set the electro-magnetic force F constant for moving the coils 25 and 26 even in case time elapses. In a distribution $C3_{Dt}$ of the third correction factor for each elapsed time t, the flux density B decreases from the flux density $B_{t0}$ to the flux density $B_{ti}$ with a ratio $r_B$ upon the lapse of the elapsed time $t_i$ from a reference time point, namely the elapsed time $t_0$. See FIG. 13. However, the third correction factor C3 is set to increase from the third correction factor $C3_0$ to the third correction factor $C3_i$ with a ratio $r_C$. Examples of the ratios $r_B$ and $r_C$ are ratios of an equal value having increasing and decreasing changes opposite to one another.

In FIG. 12, the current determiner 55 obtains a current $I_0 \times C1 \times C3$ by correcting the current $I_0$ according to the first correction factor C1 for the detected coil position P and the third correction factor C3 corresponding to the measured elapsed time t. At first, information of the coil position P is input by the magnetoresistive sensor 32, so that the first correction factor C1 is read out from the first table memory 33 according to the coil position P. Information of the elapsed time t measured by the clock device 52 is input, so that the third correction factor C3 is read out from the third table memory 54 according to the elapsed time t. Then the current $I_0$ is corrected by use of the first and third correction factors C1 and C3. The corrected current $I_0 \times C1 \times C3$ is obtained for each value of the coil position P and each value of the elapsed time t. Thus, the correction of the current $I_0$ makes it possible to maintain the electro-magnetic force F constantly even upon changes in the flux density with time. The information of the corrected current $I_0 \times C1 \times C3$ from the current determiner 55 is input to the current control unit 36.

Figure 14:
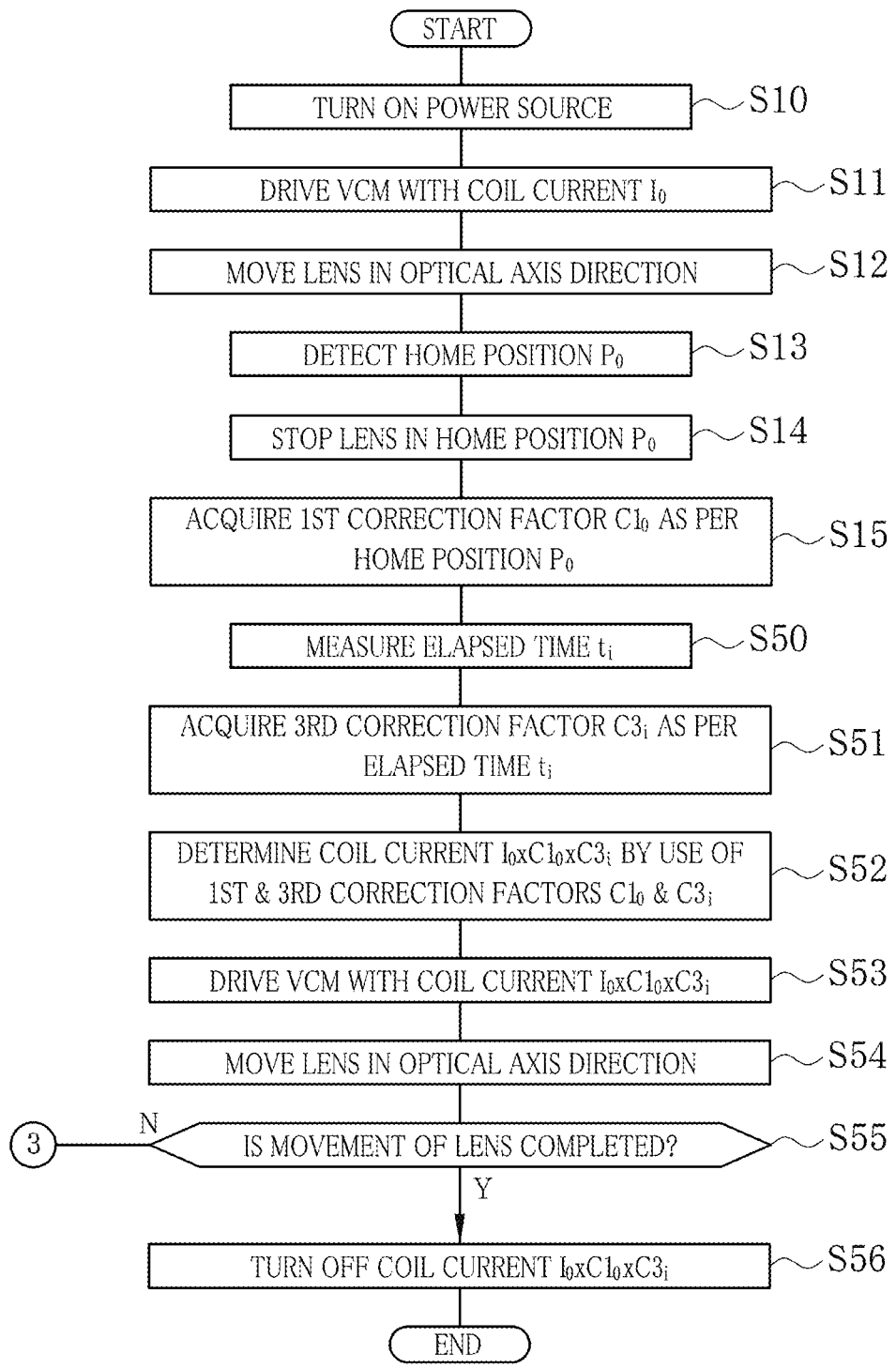
FIG. 14 is a flowchart illustrating steps at the beginning of driving the lens.
Figure 15:
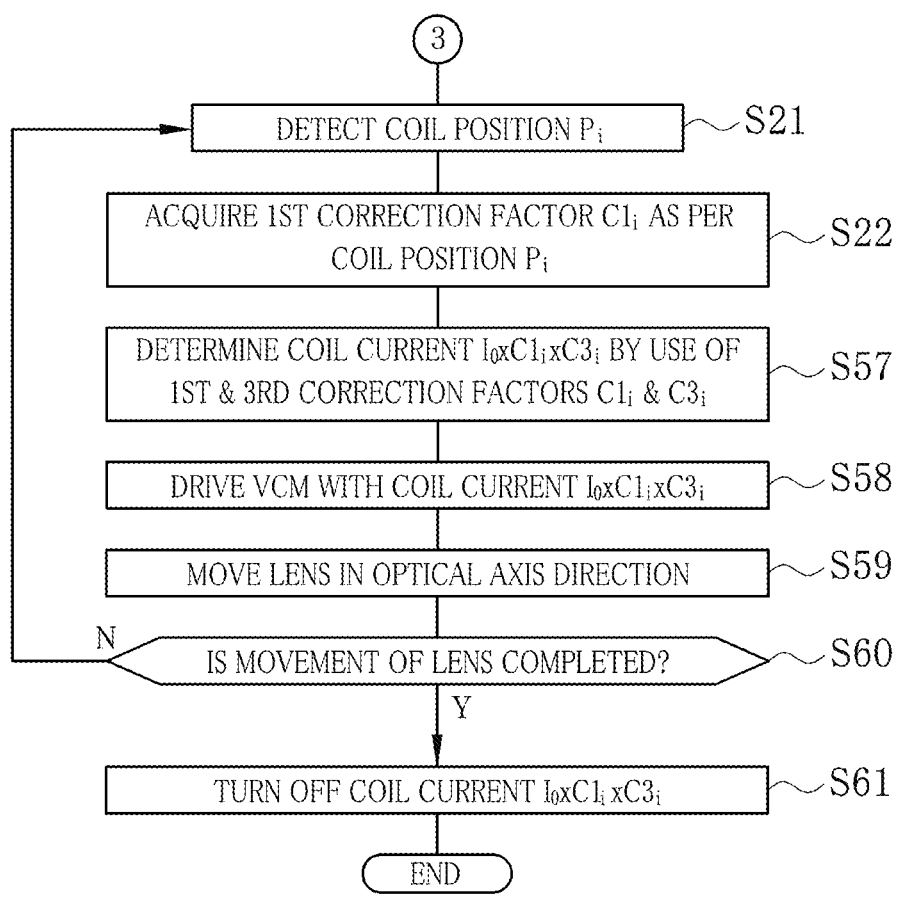
FIG. 15 is a flow chart illustrating remaining steps of driving the lens.

The operation of the third embodiment is described next by referring to the flow charts of FIGS. 14 and 15. At first, the power source of the camera is turned on in a manner similar to the first embodiment. The coils 25 and 26 are supplied with the current $I_0$ to move the lens 17 in the optical axis direction. The lens 17 is stopped in the home position $P_0$. A first correction factor $C1_0$ in the home position $P_0$ is acquired from the first table memory 33 in the steps S10-S15.

Then the elapsed time $t_i$ is read from the clock device 52 in the step S50. The third correction factor $C3_i$ is acquired from the third table memory 54 according to the elapsed time $t_i$ in the step S51. After the acquisition, the corrected current is determined in the step S52. The lens 17 is moved by driving with the corrected current in the steps S53 and S54. The powering is turned off after the lens movement in the steps S55 and S56.

Assuming that the movement of the lens 17 is not completed (no in the step S55), then the coil position is detected in the step S21. The first correction factor $C1_i$ is determined in the step S22. The current is corrected in the step S57. The lens is moved by supply of the corrected current in the steps S58 and S59. The lens movement is completed and the current is turned off in the steps S60 and S61. See FIG. 15. Assuming that the movement of the lens 17 is not completed, the steps S21-S61 are repeated until completion of the movement of the lens 17.

In the third embodiment, the third correction factor C3 for each value of the elapsed time t stored in the third table memory 54 is used additionally to the first correction factor C1 for each value of the coil position P stored in the first table memory 33. The current is further corrected to keep the electro-magnetic force F constant. It is therefore possible to suppress changes in the speed in moving the lens 17 even upon a decrease in the flux density B of the magnets 23 and 24 with time.

In the third preferred embodiment, only the third correction factor $C3_i$ is acquired at the time of moving the lens 17 from the home position $P_0$. The same third correction factor $C3_i$ is used for correcting the current at the time of further moving the lens 17. Instead of this, it is possible to use a third correction factor C3 acquired by newly measuring the elapsed time t to correct the current.

In the third embodiment, the elapsed time t is read out upon turning on the power source. Alternatively, it is possible to read out the elapsed time t upon manual depression of a measuring button (not shown) for starting measurement of the elapsed time t. Changes in the moving speed of the lens due to changes in the flux density with time can be suppressed in response to the selection of a correction mode with the elapsed time t.

Fourth Embodiment

Figure 16:
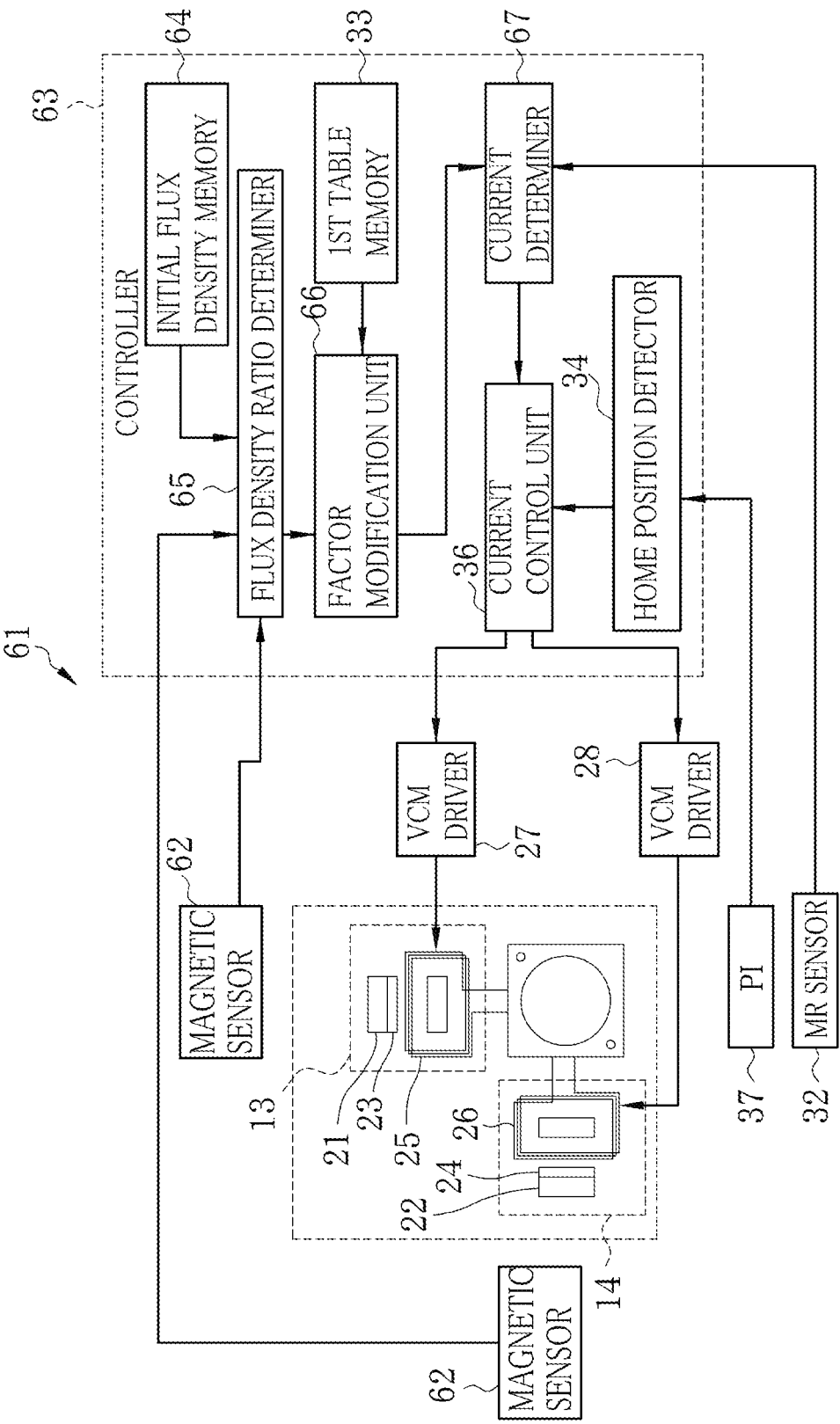
FIG. 16 is a block diagram schematically illustrating a fourth preferred lens driving apparatus.
Figure 17:
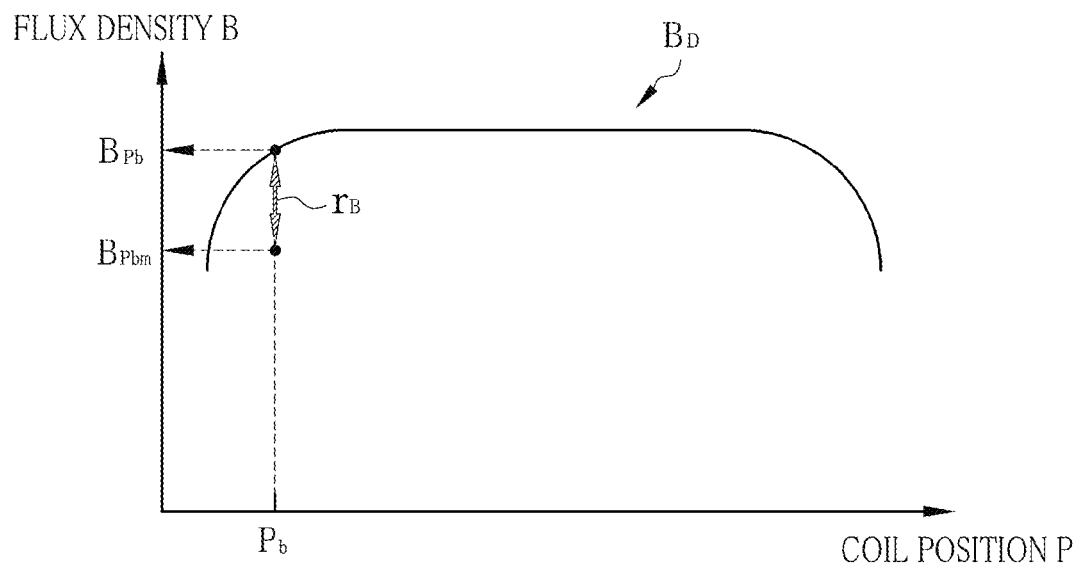
FIG. 17 is a graph illustrating a relationship between a coil position and the flux density.
Figure 18:
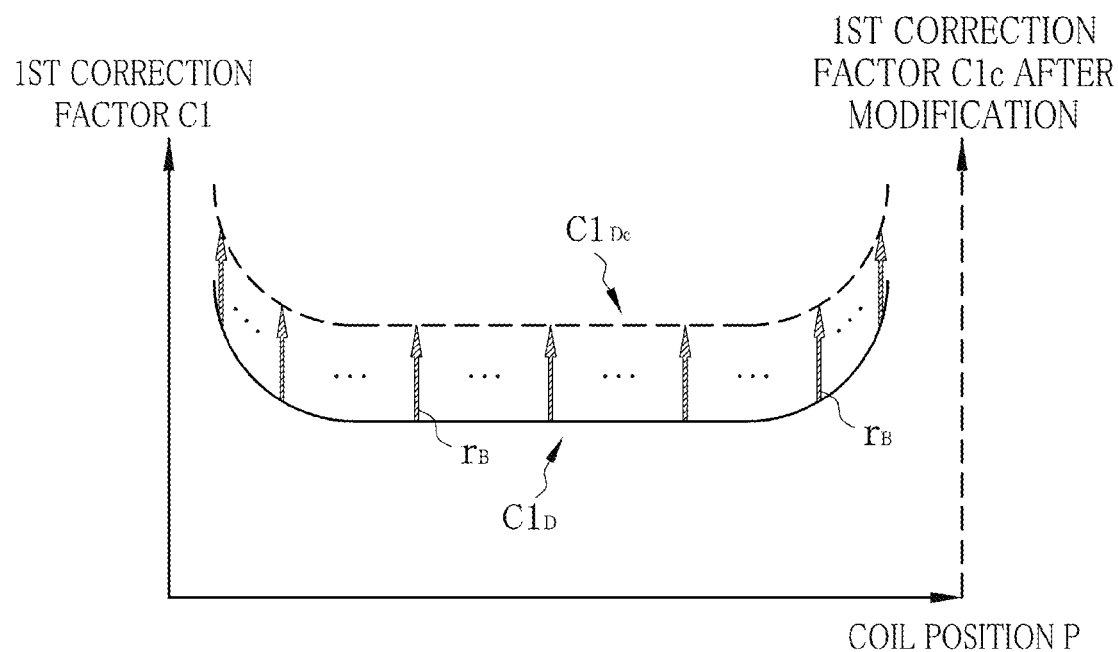
FIG. 18 is a graph illustrating correction of the first correction factor with a flux density ratio.

In FIGS. 16, 17 and 18, a fourth preferred lens driving apparatus 61 (lens assembly) includes a magnetic sensor 62 (flux density measurer). A first correction factor C1 is modified by use of a flux density ratio $r_B$ between monitored flux density $B_{Pb}m$ measured by the magnetic sensor 62 in the reference position $P_b$ and initial flux density $B_{Pb}$ as a reference previously measured in the reference position $P_b$. The lens driving apparatus 11 is repeated but with a difference in having the magnetic sensor 62 and a system controller 63 (controller). Elements similar to those of the above embodiments are designated with identical reference numerals.

An example of the magnetic sensor 62 is a sensor having a Hall element. In case the power button is depressed, powering up is detected. The magnetic sensor 62 measures flux density of the magnets 23 and 24 in the reference position $P_b$, to obtain the monitored flux density $B_{Pb}m$. The magnetic sensor 62 is attached to, for example, each of the outer yoke plates 21A and 22A opposite to a surface where the magnets 23 and 24 are attached. A position of attachment of the magnetic sensor 62 is the reference position $P_b$, where the monitored flux density $B_{Pb}m$ of the magnets 23 and 24 is measured. The reference position $P_b$ can be any one position where the monitored flux density $B_{Pb}m$ of the magnets 23 and 24 can be measured, but can be preferably each position of having measured the flux density distribution BD as a basis of determining the first correction factor C1. The magnetic sensor 62 is connected to the controller 63, and inputs information of the monitored flux density $B_{Pb}m$ measured in the reference position $P_b$ to the controller 63.

In FIG. 16, the controller 63 includes an initial flux density memory 64, a flux density ratio determiner 65, a factor modification unit 66 and a current determiner 67 (offset correction unit). The controller 29 is repeated but with a difference in having the initial flux density memory 64, the flux density ratio determiner 65, the factor modification unit 66 and the current determiner 67.

The initial flux density memory 64 stores the initial flux density $B_{Pb}$ of the magnets 23 and 24 measured previously in the reference position $P_b$. The initial flux density $B_{Pb}$ is flux density in the reference position $P_b$ measured at the time of the manufacture in a predetermined condition. Assuming that the magnet is exchanged for repair or other purposes, the stored initial flux density $B_{Pb}$ is flux density obtained at the time of measuring the magnet exchanged after the repair.

Note that the magnetic sensor 62 is used to measure the initial flux density $B_{Pb}$. However, a sensor or measuring method for use is not limited, and can be selected suitably for measuring the flux density of the magnets 23 and 24 in the reference position $P_b$.

The flux density ratio determiner 65, upon receiving information of the monitored flux density $B_{Pb}m$ from the magnetic sensor 62, reads the initial flux density $B_{Pb}$ from the initial flux density memory 64, to obtain a flux density ratio $r_B$ between the monitored flux density $B_{Pb}m$ and the initial flux density $B_{Pb}$. In FIG. 17, assuming that there occurs a decrease from the initial flux density $B_{Pb}$ to the monitored flux density $B_{Pb}m$ in the reference position $P_b$, a ratio related to the decrease is obtained as the flux density ratio $r_B$. On the condition of equality in the current through the coils 25 and 26, the electro-magnetic force Fm according to the monitored flux density $B_{Pb}m$ is smaller than the electro-magnetic force F according to the initial flux density $B_{Pb}$. Thus, a moving speed of the coils moved by the electro-magnetic force Fm according to the monitored flux density $B_{Pb}m$ is lower than a moving speed of the coils moved by the electro-magnetic force F according to the initial flux density $B_{Pb}$. It is necessary to correct the current according to the flux density ratio $r_B$ as a proportion related to a change in the flux density to maintain the moving speed of the coils constantly. Information of the flux density ratio $r_B$ obtained by the flux density ratio determiner 65 is input to the factor modification unit 66 as illustrated in FIG. 16.

The factor modification unit 66 modifies the first correction factor C1 stored in the first table memory 33 by use of the input flux density ratio $r_B$ from the flux density ratio determiner 65, and obtains a first correction factor C1c after being modified. For example, upon occurrence of a decrease from the initial flux density $B_{Pb}$ to the monitored flux density $B_{Pb}m$, the first correction factor C1 is increased for each coil position P according to the flux density ratio $r_B$ which expresses the decrease in the magnetism, as illustrated in FIG. 18. Thus, obtaining the first correction factor C1c after being modified with the flux density ratio $r_B$ for each coil position P makes it possible to obtain a first correction factor distribution $C1_Pc$ with an increase with the flux density ratio $r_B$.

In FIG. 16, the current determiner 67 corrects the current $I_0$ by use of the first correction factor C1c modified according to the flux density ratio $r_B$ corresponding to the detected coil position P. At first, the first correction factor C1 is read from the first table memory 33 through the factor modification unit 66 upon receiving information of the coil position P from the magnetoresistive sensor 32. The first correction factor C1 is modified by use of the flux density ratio $r_B$ in the factor modification unit 66. The current $I_0$ is corrected by use of the modified value of the first correction factor C1c, to obtain a corrected current $I_0 \times C1c$. The corrected current $I_0 \times C1c$ is obtained for the respective coil position P. Consequently, it is possible to maintain the electro-magnetic force F constantly by correcting the current $I_0$ with the first correction factor C1c after being modified, even upon occurrence of changes in the flux density with time or with changes in the temperature. Information of the corrected current $I_0 \times C1c$ from the current determiner 67 is input to the current control unit 36.

Figure 19:
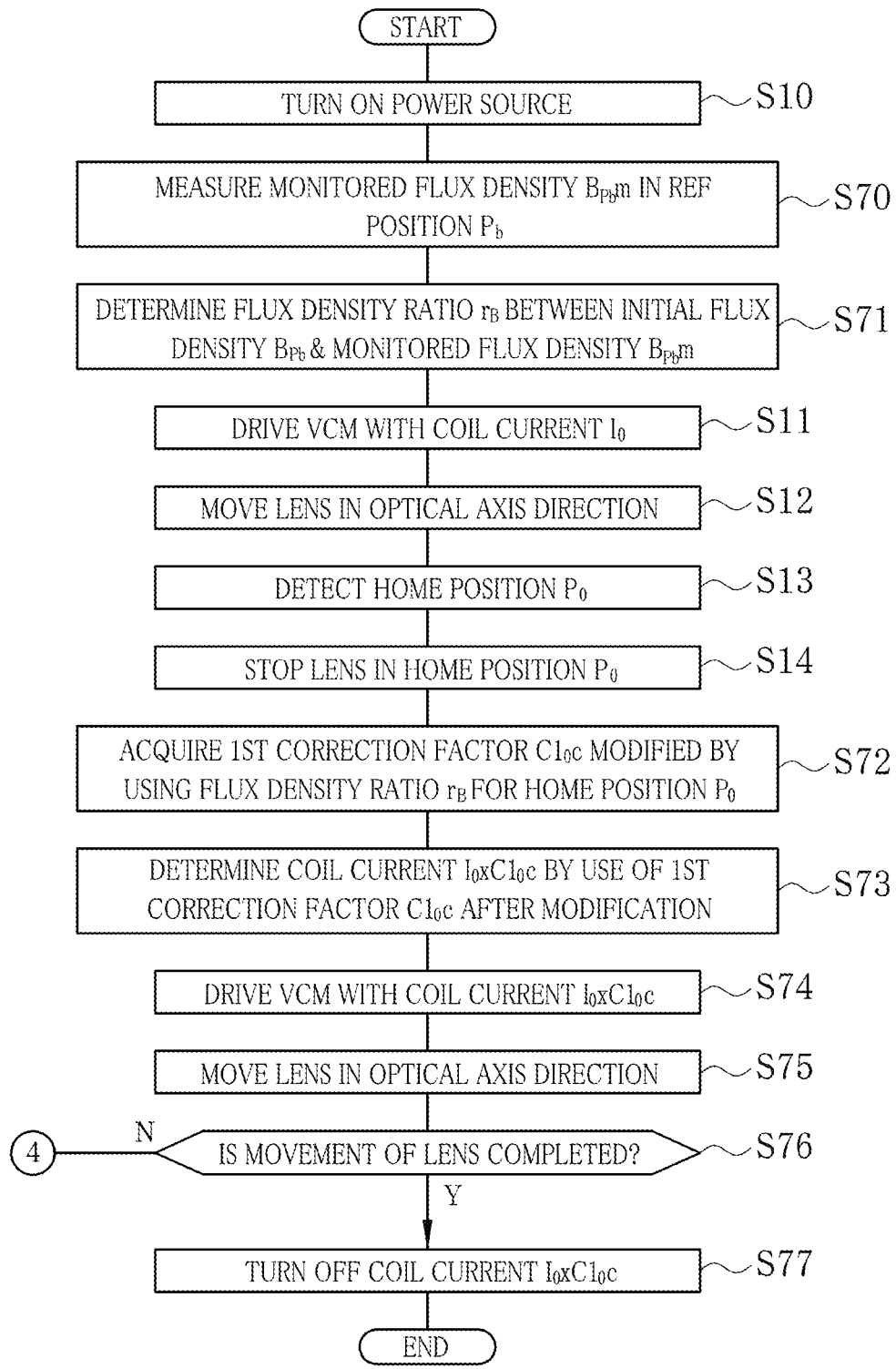
FIG. 19 is a flowchart illustrating steps at the beginning of driving the lens.
Figure 20:
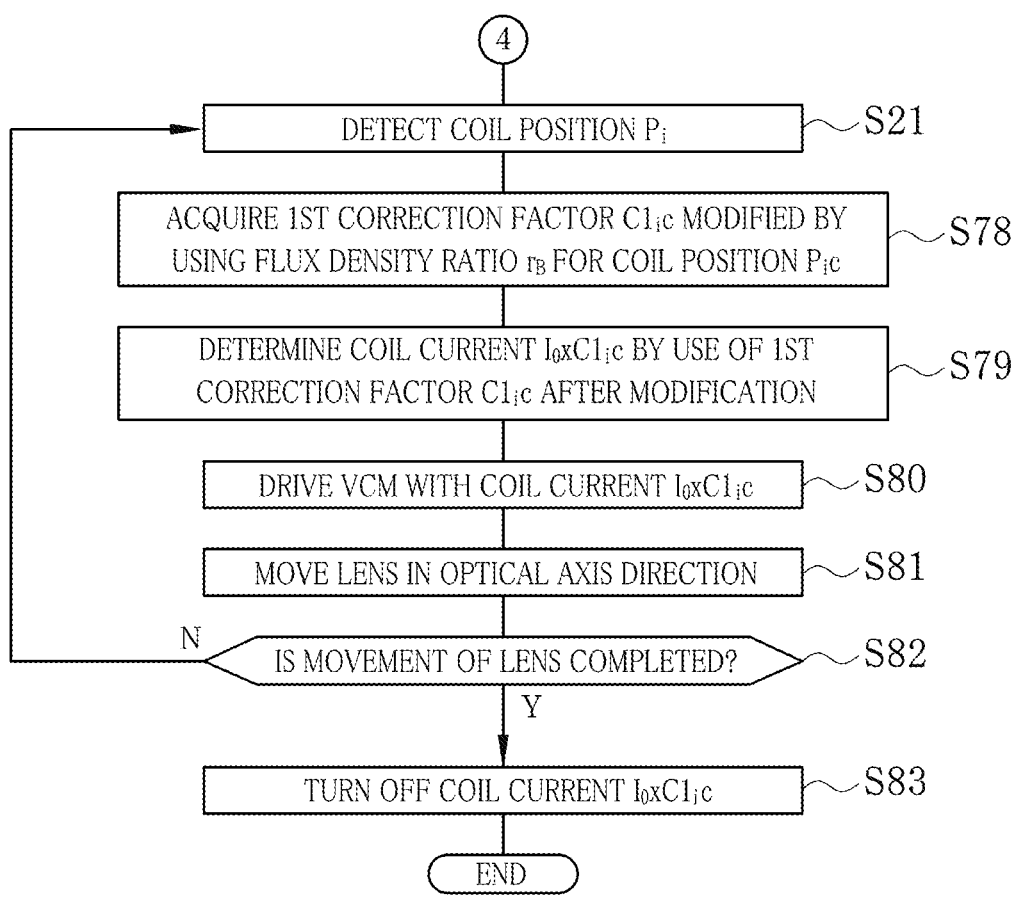
FIG. 20 is a flow chart illustrating remaining steps of driving the lens.

The operation of the fourth embodiment is described by referring to the flow chart of FIGS. 19 and 20. In case the power source is turned on in the step S10, the magnetic sensor 62 measures the monitored flux density $B_{Pb}m$ in the reference position $P_b$ in the step S70. Then the monitored flux density $B_{Pb}m$ is compared with the initial flux density $B_{Pb}$ stored in the initial flux density memory 64 for the reference position $P_b$, to calculate the flux density ratio $r_B$ in the step S71. Then the current $I_0$ is supplied to the coils 25 and 26 to move the lens 17 in the optical axis direction. The lens 17 is stopped in the detected home position $P_0$ in the steps S11-S14.

Then the first correction factor C1 for the home position $P_0$ where the lens 17 is stopped is modified by use of the flux density ratio $r_B$, to determine a modified value of a first correction factor $C1_0c$ in the step S72. Then a corrected current $I_0 \times C1_0c$ is determined by correcting the current $I_0$ with the first correction factor $C1_0c$ after being modified in the step S73. The corrected current $I_0 \times C1_0c$ is caused to flow through the coils 25 and 26 by the VCM drivers 27 and 28 in the step S74. The lens 17 is moved together with the coils 25 and 26 by the corrected current $I_0 \times C1_0c$ in the step S75. Assuming that the movement of the lens 17 is completed (yes in the step S76), the corrected current $I_0 \times C1_0c$ is turned off in the step S77.

Assuming that the movement of the lens 17 is not completed (no in the step S76), then the coil position Pi is detected in the step S21. A modified value of the first correction factor $C1ic$ is determined in the step S78. The current is corrected in the step S79. The lens is moved by supply of the corrected current in the steps S80 and S81. The lens movement is completed and the current is turned off in the steps S82 and S83. See FIG. 20. Assuming that the movement of the lens 17 is not completed (no in the step S82), the steps S21-S82 are repeated until completion of the movement of the lens 17.

In the present embodiment, the flux density ratio $r_B$ is obtained upon powering up according to the monitored flux density $B_{Pb}m$ measured in the reference position $P_b$ and the initial flux density $B_{Pb}$ measured previously in the reference position $P_b$. The first correction factor C1 is modified by use of the flux density ratio $r_B$ as modification data for the correction factor. It is therefore possible to control the current with the first correction factor $C1c$ after being modified, and to generate electro-magnetic force of a constant level even with changes in the flux density with time or changes in temperature. Changes in the speed in moving the lens 17 can be suppressed.

In the fourth embodiment, the monitored flux density $B_{Pb}m$ of the reference position $P_b$ is measured upon powering up. However, the monitored flux density $B_{Pb}m$ can be measured at any one time point of manually depressing a measuring button (not shown) for starting measurement of the monitored flux density $B_{Pb}m$.

Figure 21:
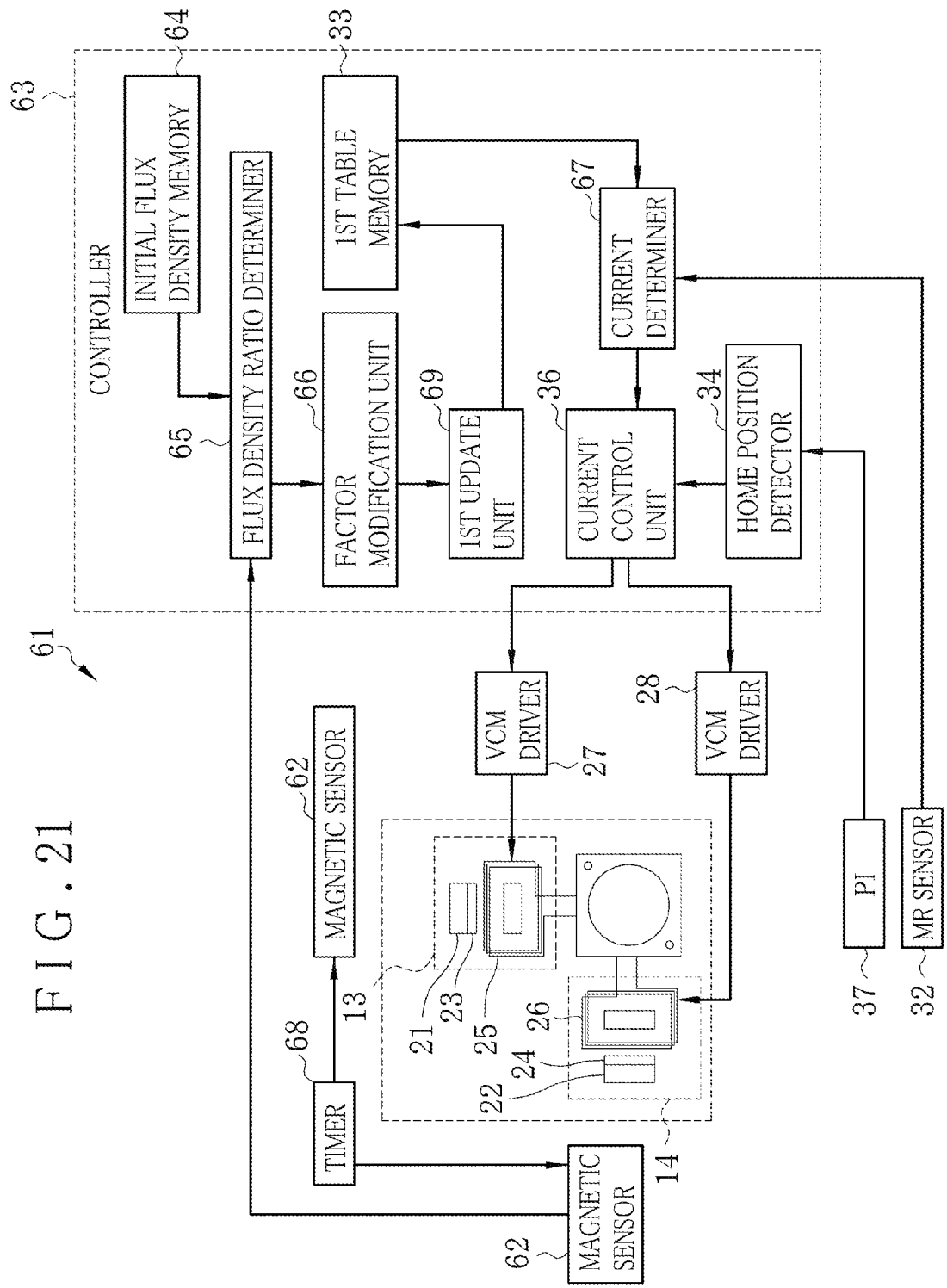
FIG. 21 is a block diagram schematically illustrating a variant of the fourth preferred lens driving apparatus.

Note that the monitored flux density $B_{Pb}m$ can be measured in the reference position $P_b$ repeatedly at each time of lapse of a regular period. In FIG. 21, a timer 68 is used. The period for measuring the monitored flux density $B_{Pb}m$ is predetermined. Also, a first update unit 69 can be used. A first correction factor $C1c$ after being modified is obtained by use of the flux density ratio $r_B$ obtained at each time of lapse of the regular period. The first update unit 69 can update the first correction factor C1 in the first table memory 33 by use of the first correction factor $C1c$ after being modified. Load to the apparatus can be reduced by the periodically updating the first table memory 33 in comparison with the structure for modifying the first correction factor C1 at each time of detecting the coil position P.

Also, changes in the monitored flux density $B_{Pb}m$ can be estimated by the linear approximation or the like of the monitored flux density $B_{Pb}m$ measured at each time of lapse of the predetermined period. The flux density ratio $r_B$ can be obtained according to the estimated monitored flux density $B_{Pb}m$ by estimating the changes in the monitored flux density $B_{Pb}m$. The current is corrected by use of the first correction factor $C1c$ modified according to the flux density ratio $r_B$. Before a new flux density ratio $r_B$ is obtained, the first correction factor C1 can be modified by use of the estimated flux density ratio $r_B$. Load to the apparatus can be reduced by a decrease in the number of events of measuring the monitored flux density $B_{Pb}m$, to suppress changes in the speed of moving the lens 17.

Note that a decrease in the flux density of a magnet with time is influenced by external factors such as the temperature T or the like. It is possible to restrict the current correction by use of the flux density ratio $r_B$ assuming that the flux density ratio $r_B$ is less than 5%. Assuming that such a decrease in the flux density with time is small, or assuming that the linear approximation is used, then changes with time can be estimated as a sufficiently small value, so that changes in the flux density immediately upon powering up is likely to depend upon changes in the temperature. Consequently, it is possible to estimate the temperature T according to changes in the flux density, and correct the current according to the estimated temperature T.

Fifth Embodiment

Figure 22:
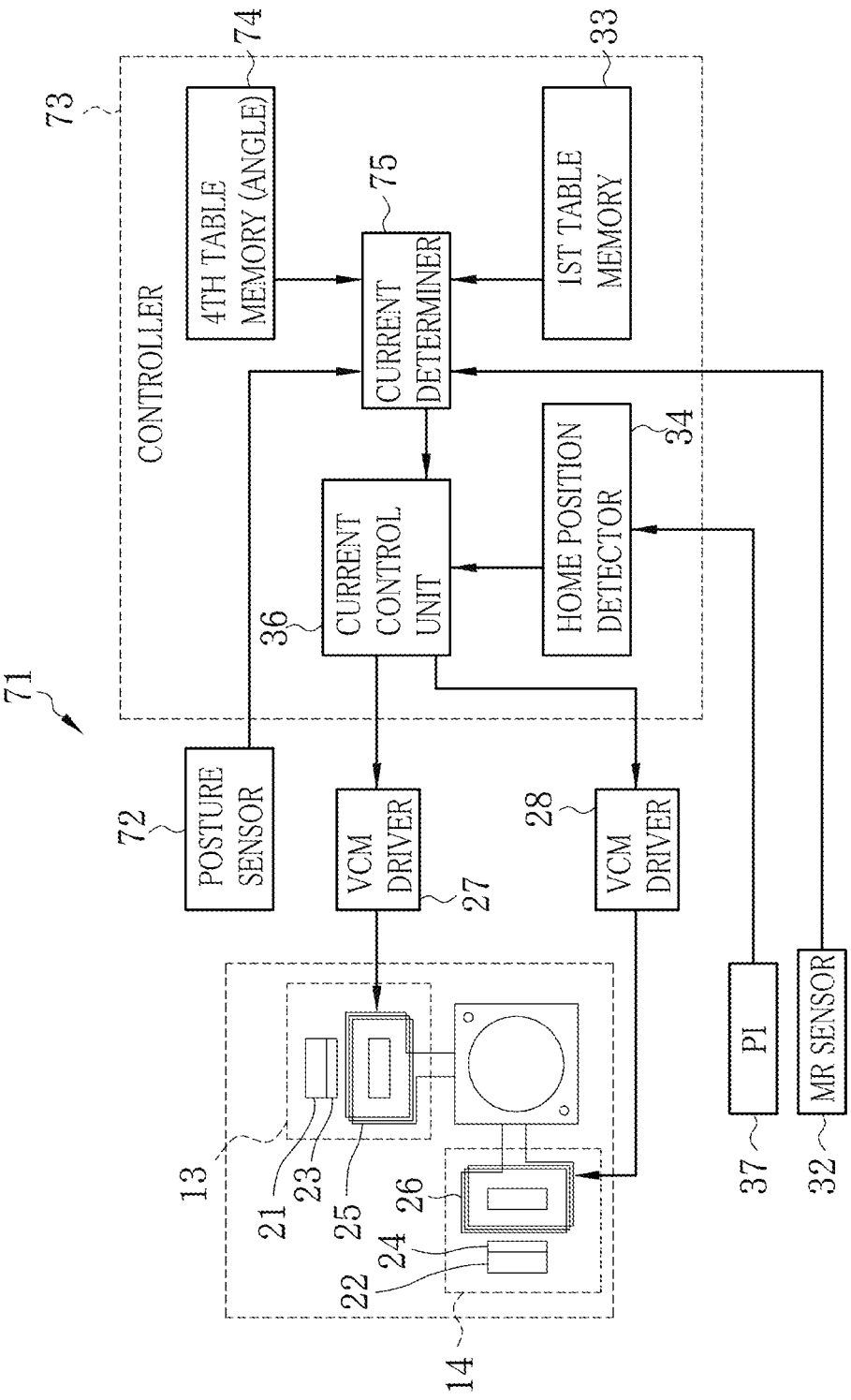
FIG. 22 is a block diagram schematically illustrating a fifth preferred lens driving apparatus.

In FIG. 22, a fifth preferred lens driving apparatus 71 (lens assembly) is illustrated. A posture sensor 72 is used to detect an elevation/depression angle θ of the lens barrel 12. The current is further corrected by use of a fourth correction factor C4 (second correction factor) in compliance with the elevation/depression angle θ. In the lens driving apparatus 71, the lens driving apparatus 11 is repeated but with a difference in having a system controller 73 (controller) and the posture sensor 72. Elements similar to those of the above embodiments are designated with identical reference numerals.

The posture sensor 72 detects the elevation/depression angle θ of the lens barrel 12. An example of the posture sensor 72 is constituted by a gyro sensor, processing circuit and the like. The posture sensor 72 can be disposed in a suitable manner in a condition of detecting the elevation/depression angle θ of the lens barrel 12 and without unwanted influence to a function of the lens driving apparatus 71. The elevation/depression angle θ is based on a tilt of the digital camera having the lens barrel 12. An elevation angle with reference to a horizontal direction is denoted by a positive value. A depression angle with reference to the horizontal direction is denoted by a negative value. The posture sensor 72 inputs information of the detected elevation/depression angle θ to the controller 73.

The controller 73 has a fourth table memory 74 (angle) which constitutes a second table memory of the invention, and a current determiner 75 (offset correction unit). For the controller 73, the controller 29 is repeated but with a difference in having the fourth table memory 74 and the current determiner 75. Elements similar to those of the above embodiments are designated with identical reference numerals.

The fourth table memory 74 stores a relationship between the elevation/depression angle θ and a fourth correction factor C4. The fourth correction factor C4 is used to correct a current flowing through the coils 25 and 26 according to the elevation/depression angle θ. While the digital camera having the lens barrel 12 is tilted to increase the elevation angle, shortage in the force of the first and second voice coil motors 13 and 14 may occur in the course of moving the lens 17 forwards toward the object side. While the digital camera having the lens barrel 12 is tilted to increase the depression angle, shortage in the force of the first and second voice coil motors 13 and 14 may occur in the course of moving the lens 17 backwards from the object side. It is difficult correctly to move the lens 17 at a high speed in case driving of the lens 17 is insufficient due to the shortage in the force of the first and second voice coil motors 13 and 14. It is therefore necessary to set a current larger for a large value of the elevation/depression angle θ than for a small value of the elevation/depression angle θ. There occurs a large change in the generated electro-magnetic force F upon changes in the flux density B with the flow of the large current. Influence of the changes of the flux density to the electro-magnetic force F is large because the current is large while the elevation/depression angle θ is large. As a result, the moving speed of the coils 25 and 26 driven with the electro-magnetic force F is influenced considerably.

Figure 23:
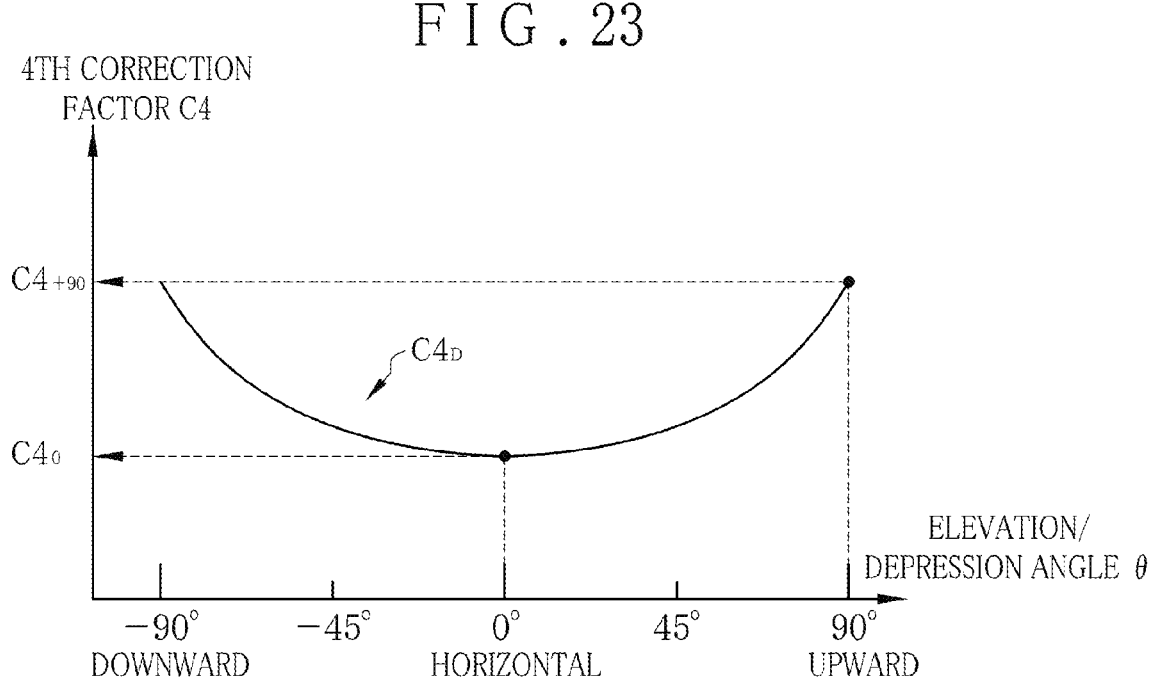
FIG. 23 is a graph illustrating a relationship between an elevation/depression angle and a fourth correction factor.

Thus, the fourth correction factor C4 is used for correcting the current according to the elevation/depression angle θ so as to keep the electro-magnetic force F constant for moving the coils 25 and 26 even with a flow of a large current in a condition of the large elevation/depression angle θ. In FIG. 23, an example of the fourth correction factor C4 is illustrated. Let zero (0) degree denote a horizontal state of maintaining the digital camera horizontally with the lens barrel 12. The elevation/depression angle θ in directing the lens upwards vertically is +90 degrees. The elevation/depression angle θ in directing the lens downwards vertically is −90 degrees. In a distribution $C4_D$ of the fourth correction factor, a fourth correction factor $C4_0$ in the horizontal state is the minimum. A fourth correction factor $C4_{+90}$ and $C4_{-90}$ with the elevation/depression angle θ of +90 and −90 degrees are the maximum. An example of the minimum of the fourth correction factor is 1 in the horizontal state used as a reference.

In FIG. 22, the current determiner 75 obtains a corrected current $I_0 \times C1 \times C4$ by correcting a current $I_0$ by use of the first correction factor C1 and the fourth correction factor C4. In case information of the coil position P is input from the magnetoresistive sensor 32, the first correction factor C1 is read from the first table memory 33 according to the coil position P. In case information of the elevation/depression angle θ is input from the posture sensor 72, the fourth correction factor C4 is read from the fourth table memory 74 according to the elevation/depression angle θ. Then the current $I_0$ is corrected by use of the first and fourth correction factors C1 and C4. The corrected current $I_0 \times C1 \times C4$ is obtained for the respective coil position P and the respective elevation/depression angle θ. Consequently, the electro-magnetic force F can be kept constant by correcting the current $I_0$ by use of the first and fourth correction factors C1 and C4 even upon an increase in the current with changes in the elevation/depression angle θ. Information of the corrected current $I_0 \times C1 \times C4$ from the current determiner 75 is input to the current control unit 36.

Figure 24:
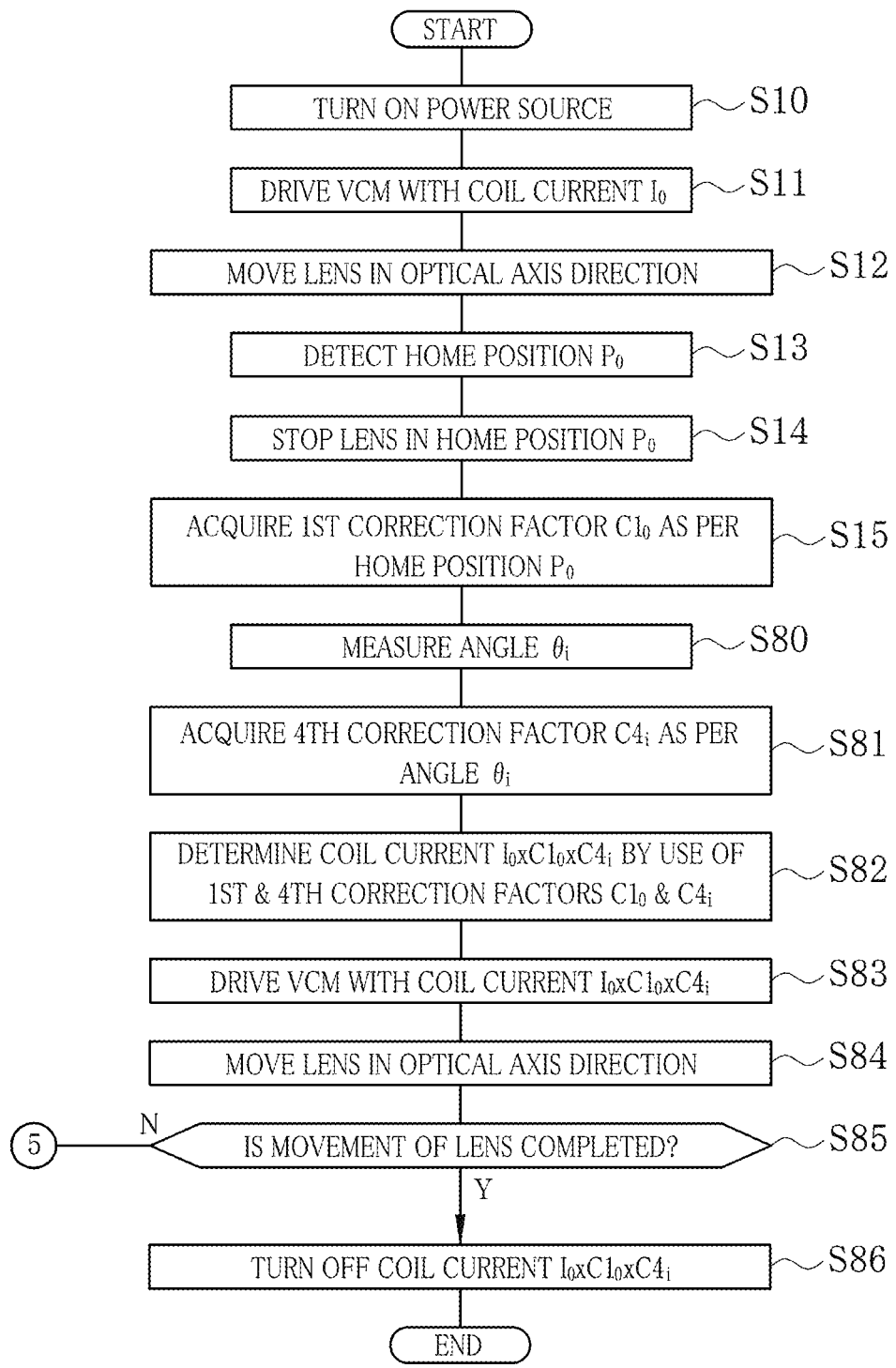
FIG. 24 is a flowchart illustrating steps at the beginning of driving the lens.
Figure 25:
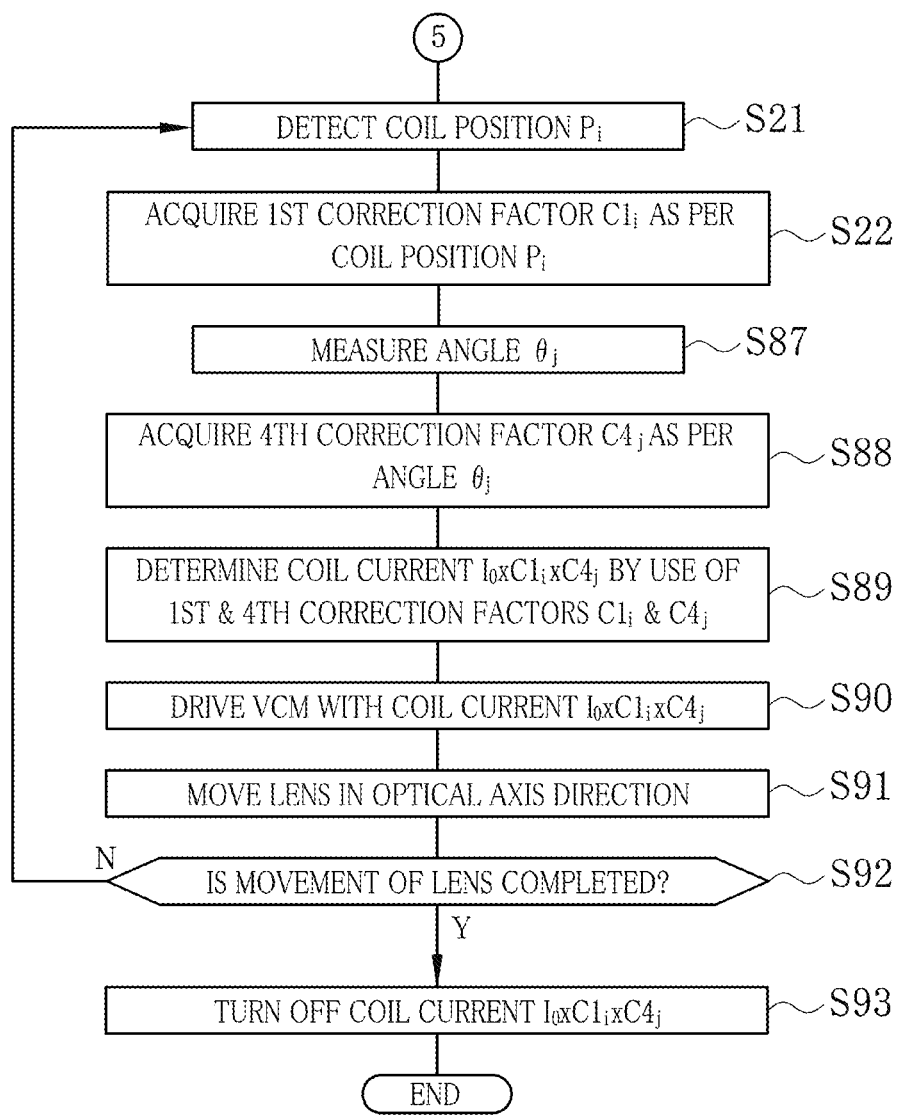
FIG. 25 is a flow chart illustrating remaining steps of driving the lens.

The operation of the fifth embodiment is described by referring to the flow charts of FIGS. 24 and 25. The camera is powered in a manner similar to the first embodiment. The current $I_0$ is caused to flow through the coils 25 and 26 to move the lens 17 in the optical axis direction. The lens 17 is stopped at the detected home position $P_0$, of which the first correction factor $C1_0$ is acquired from the first table memory 33 in the step S10-S15.

Then an elevation/depression angle $θ_i$ of the lens barrel 12 is measured in the step S80. A fourth correction factor $C4_i$ according to the elevation/depression angle $θ_i$ is acquired in the step S81. A corrected current is determined by use of the first correction factor $C1_0$ and the fourth correction factor $C4_i$ in the step S82. The coils 25 and 26 are supplied with the determined corrected current in the step S83. Thus, the lens 17 is moved together with the coils 25 and 26 in the step S84. In case the movement of the lens 17 is completed (yes in the step S85), the corrected current $I_0 \times C1_0 \times C4_i$ is turned off.

Assuming that the movement of the lens 17 is not completed (no in the step S85), steps of S21-S93 are performed, including detection of the coil position (S21), acquisition of the first correction factor $C1_i$ (S22), measurement of the elevation/depression angle (S87), acquisition of the fourth correction factor $C4_i$ (S88), determination of the corrected current (S89), supply of the corrected current and shift of the lens (S90 and S91), and completion of the movement of the lens and turning off of the current (S92 and S93). See FIG. 25. Assuming that the movement of the lens 17 is not completed (no in the step S92), the steps of S21-S92 are repeated until completion of the movement of the lens 17.

In the present embodiment, the fourth correction factor C4 for the respective elevation/depression angle θ stored in the fourth table memory 74 is used additionally to the first correction factor C1 for the respective coil position P stored in the first table memory 33, to keep the electro-magnetic force F constant by correcting the current. Changes in the speed while the lens 17 is moved are suppressed even upon an increase in the current for larger force in the course of an increase of the elevation/depression angle θ of the digital camera.

Sixth Embodiment

Figure 26:
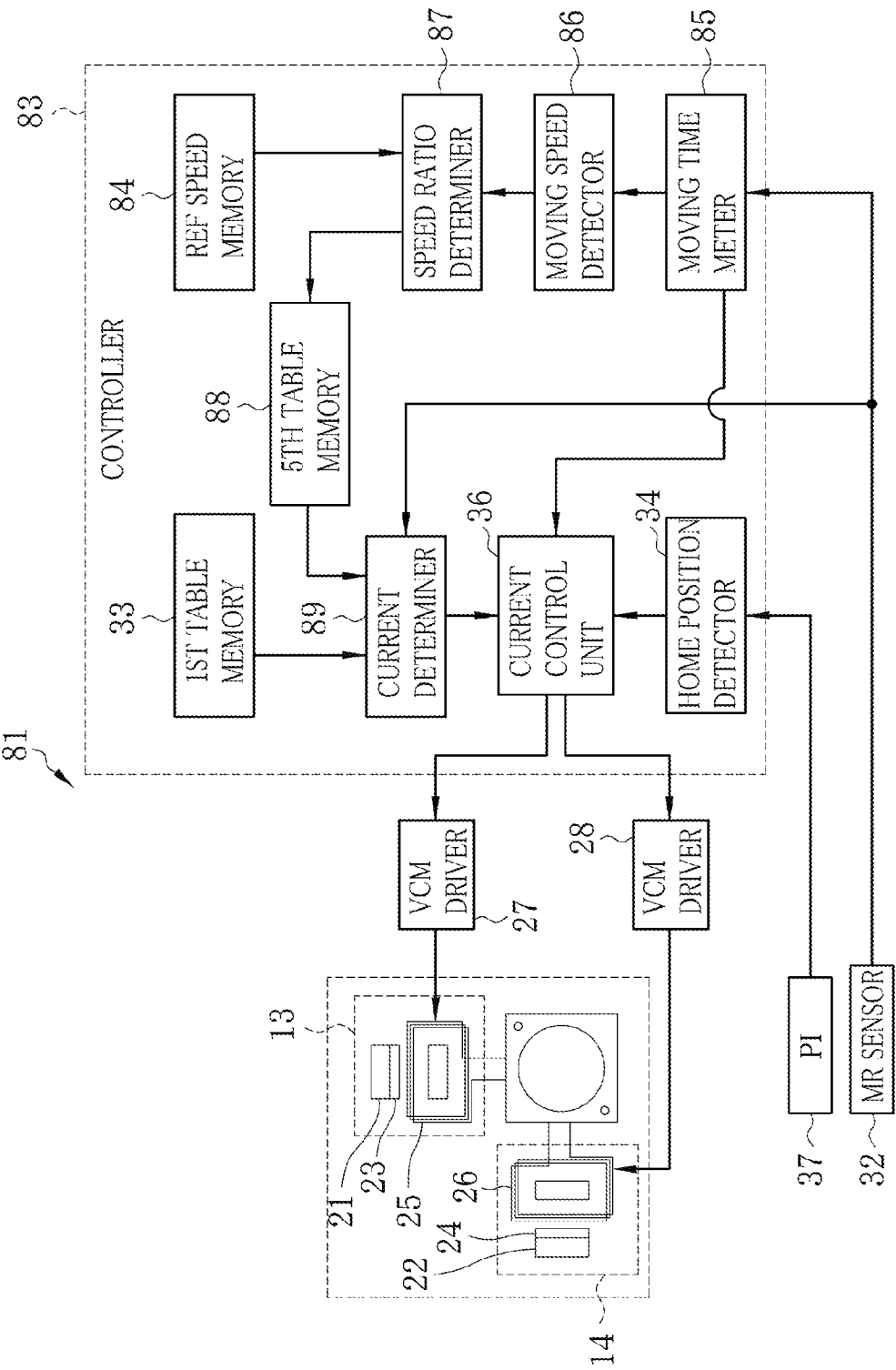
FIG. 26 is a block diagram schematically illustrating a sixth preferred lens driving apparatus.

In FIG. 26, a sixth preferred lens driving apparatus 81 (lens assembly) is illustrated. The first correction factor C1 is modified by use of a ratio between a moving speed obtained for each of the sections S defined in a moving range of the coils 25 and 26 and a reference moving speed stored for each of the sections S. For the lens driving apparatus 81, the lens driving apparatus 11 is repeated but with a difference in having a system controller 83 (controller). The controller 83 includes a reference speed memory 84, a moving time meter 85, a moving speed detector 86, a speed ratio determiner 87, a fifth table memory 88 (speed) and a current determiner 89 (offset correction unit). Elements similar to those of the above embodiments are designated with identical reference numerals.

The reference speed memory 84 stores a reference moving speed $v_0$ according to previously measured moving speed of the coils 25 and 26. The reference moving speed $v_0$ is a moving speed obtained for each one of the sections S while the coils 25 and 26 are moved fully in the moving range in a condition predetermined in the manufacture. Assuming that the magnet is exchanged for the repair or the like, the reference moving speed $v_0$ is one obtained upon measuring the coils 25 and 26 for each section S after the repair. It is possible to obtain the reference moving speed $v_0$ by measuring moving time of the coils 25 and 26 of movement in the sections S and combining a section length D (moving distance) of the sections S with the moving time. Also, it is possible to obtain the reference moving speed $v_0$ by measuring this by use of a speed sensor or the like for each of the sections S. The number of the sections S can be determined as desired. A preferable value of the number of the sections S can be 10-1,000 in compliance with capacity of the memory. Also, the section length D can be equal between the sections S, or can be values differently determined between the sections S.

In case powering up by depressing the power button is detected, the moving time meter 85 causes the coils 25 and 26 to move in the entire moving range with the current $I_0$, to measure the moving time $t_M$ required for moving the coils 25 and 26 in each section S. The moving time $t_M$ is measured in each section S by monitoring the position of the coils 25 and 26 with the magnetoresistive sensor 32 during back to forth movement in each section S. The section length D and the number of the sections S are determined equally to the section length D and the number of the sections S of which the reference moving speed $v_0$ is stored in the reference speed memory 84. For the back to forth movement, the coil position P of the coils 25 and 26 upon initial powering is a start position of the movement. A direction of the current $I_0$ for the coils 25 and 26 is reversed, to reverse the moving direction of the coils 25 and 26. Note that assuming that the lens holder 18 is stopped in the home position $P_0$ by movement upon turning off the power source, the start position of the back and forth movement is the home position $P_0$. Information of the moving time $t_M$ for each section S measured by the moving time meter 85 is input to the moving speed detector 86.

Figure 27:
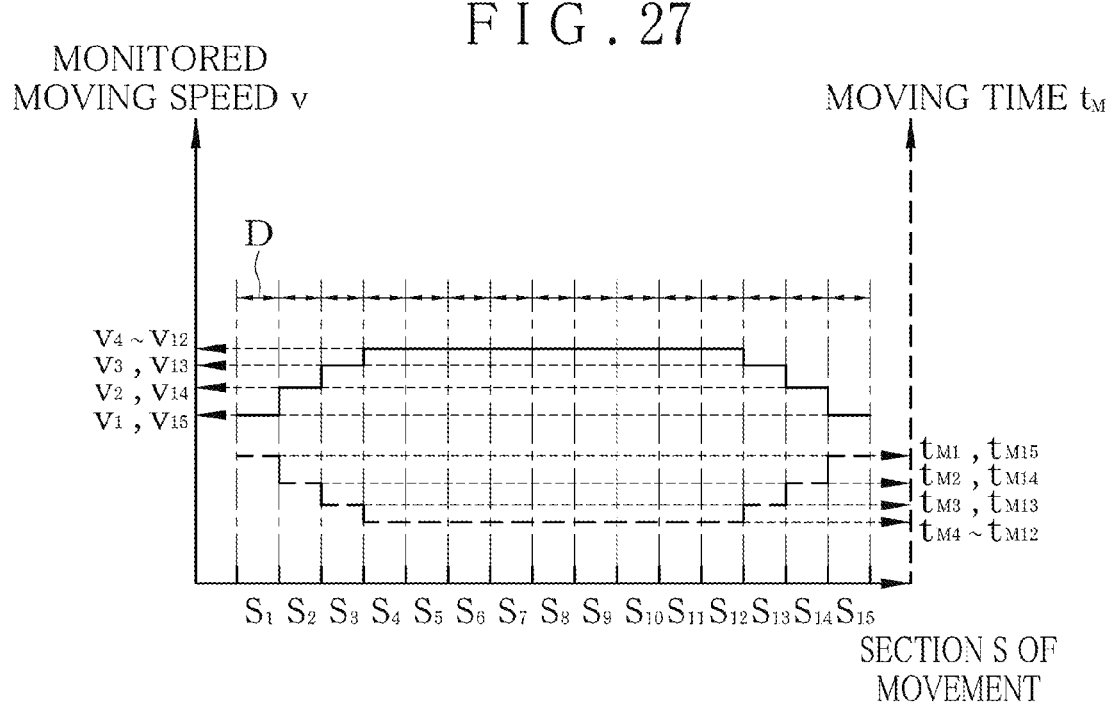
FIG. 27 is a graph illustrating a relationship between moving time and moving speed for each of sections.

In case information of the moving time $t_M$ of the sections S is input from the moving time meter 85, a monitored moving speed v is obtained as a moving speed of the coils 25 and 26 according to the moving time $t_M$ and the section length D of the sections S. The monitored moving speed v is obtained for all of the sections S. Let sections $S_1$-$S_{15}$ be obtained by equally dividing the moving range by the equal section length D. See FIG. 27. Assuming that moving time in the sections $S_1$ and $S_{15}$ is $t_{M1}$ and $t_{M15}$, the monitored moving speeds $v_1$ and $v_{15}$ are determined. Assuming that moving time in the sections $S_2$ and $S_{14}$ is $t_{M2}$ and $t_{M14}$, the monitored moving speeds $v_2$ and $v_{14}$ are determined. Assuming that moving time in the sections $S_3$ and $S_{13}$ is $t_{M3}$ and $t_{M13}$, the monitored moving speeds $v_3$ and $v_{13}$ are determined. Assuming that moving time in the sections $S_4$-$S_{12}$ is $t_{M4}$-$t_{M12}$, the monitored moving speeds $v_4$-$v_{12}$ are determined. Information of the monitored moving speeds v for the respective sections S from the moving speed detector 86 is input to the speed ratio determiner 87.

Figure 28:
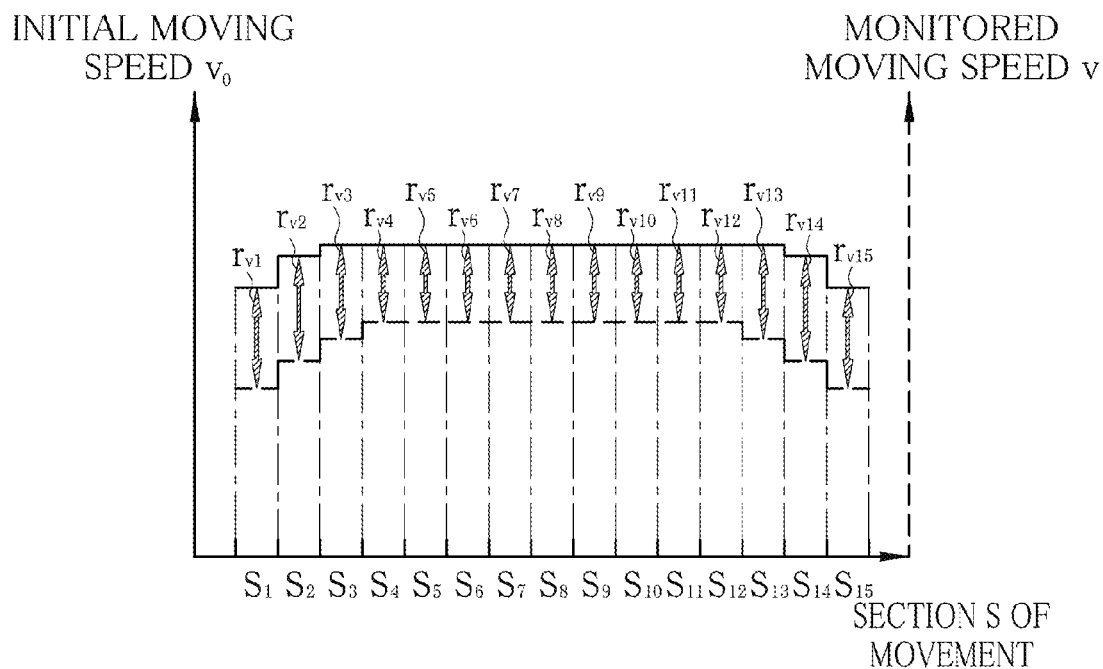
FIG. 28 is a graph illustrating a speed ratio.

Upon receiving the input of the monitored moving speed v from the moving speed detector 86 for each section S, the speed ratio determiner 87 compares the monitored moving speed v with the reference moving speed $v_0$ in the same section S, to obtain the speed ratio $r_v$ for each section S as a ratio of the moving speed. As illustrated in FIG. 28, the monitored moving speed v is compared with the reference moving speed $v_0$ in each of the sections $S_1$-$S_{15}$, to obtain the speed ratio $r_{v1}$-$r_{v15}$ for each of the sections $S_1$-$S_{15}$. Information of the speed ratio $r_v$ for each section S from the speed ratio determiner 87 is input to the fifth table memory 88.

The fifth table memory 88 stores the speed ratio $r_v$ from the speed ratio determiner 87 for each of the sections S. As the sections S are defined by dividing the moving range of the coils 25 and 26, one of the sections S usually includes a plurality of coil positions P. Thus, the fifth table memory 88 stores the speed ratio $r_v$ for each of the sections S including a plurality of coil positions P of the coils 25 and 26.

The current determiner 89 obtains the corrected current by use of a first correction factor $C1d$. At first, the first correction factor $C1d$ is read out from the first table memory 33 in correspondence with the coil position P. The speed ratio $r_v$ is read out from the fifth table memory 88 in correspondence with one of the sections S including the coil position P. The first correction factor $C1d$ is modified according to the speed ratio $r_v$. Consequently, the electro-magnetic force F can be maintained constantly by correcting the current $I_0$ with the first correction factor $C1d$ after the modification, even upon changes in the flux density with time or with changes in the temperature. Information of the corrected current $I_0 \times C1d$ from the current determiner 89 is input to the current control unit 36.

Figure 29:
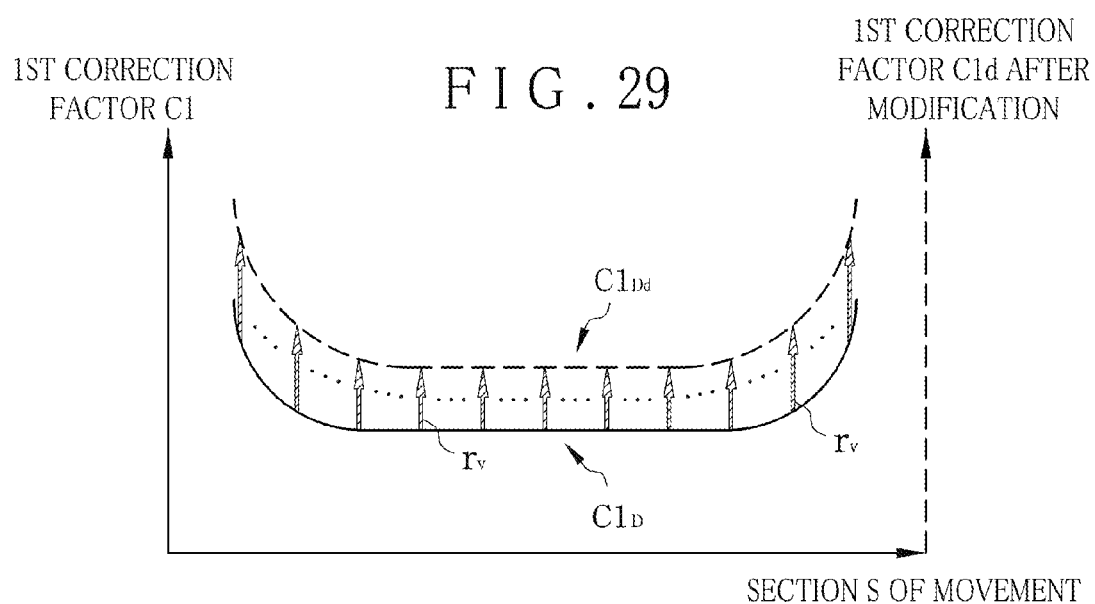
FIG. 29 is a graph illustrating correction of the first correction factor by use of the speed ratio.

As each one section S includes plural coil positions P, plural values of the first correction factor $C1$ are modified by use of the equal speed ratio $r_v$. Assuming that the number of the sections S of the division is small, a distribution $C1_D d$ of the first correction factor after being modified for each section S comes to have a distinct difference on a borderline between adjacent sections S. In FIG. 29, it is preferable to obtain the distribution $C1_D d$ of the first correction factor after being modified with a small difference on a borderline e between adjacent sections S, by raising the number of the sections S of the division.

Figure 30:
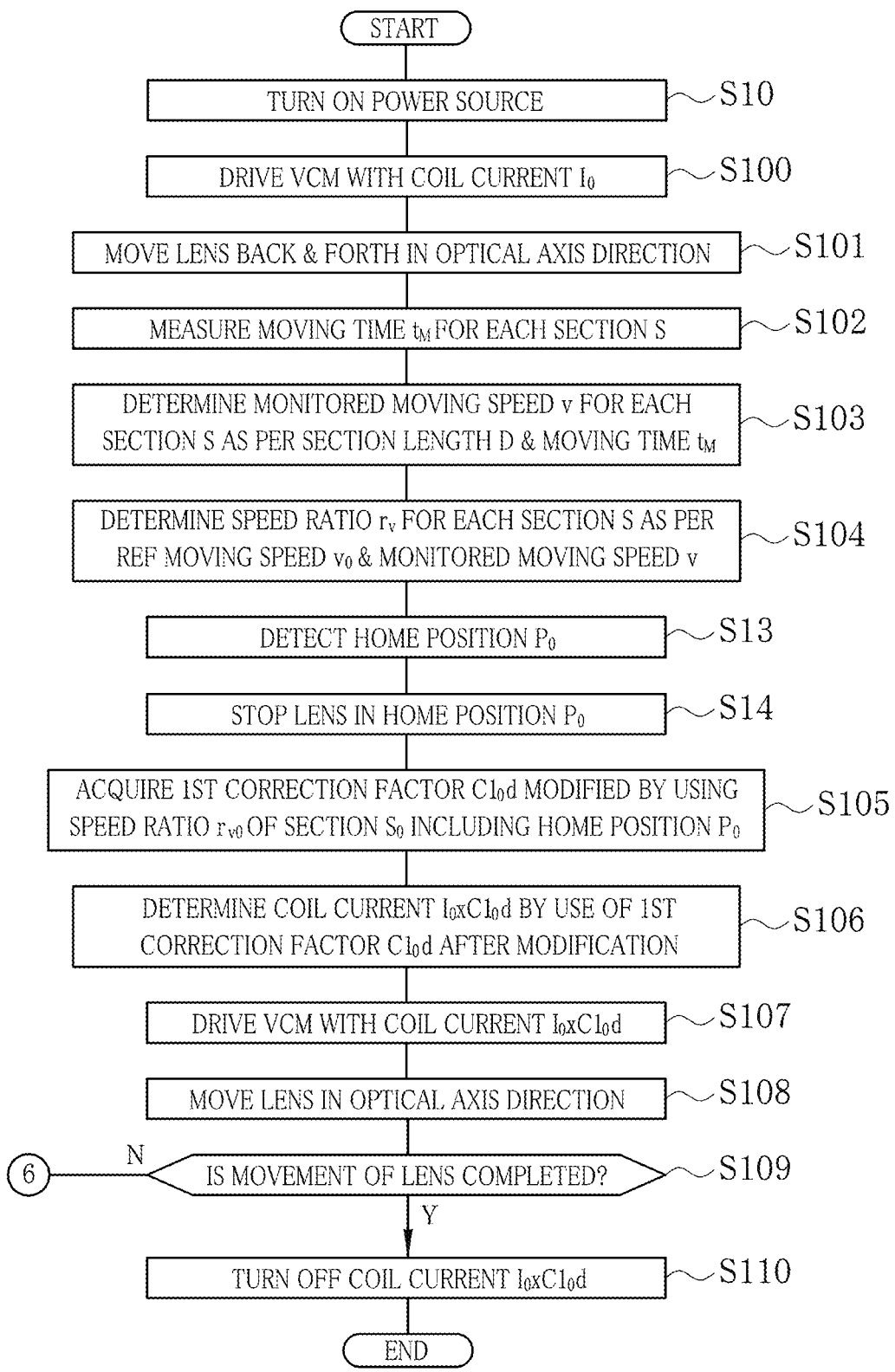
FIG. 30 is a flowchart illustrating steps at the beginning of driving the lens.
Figure 31:
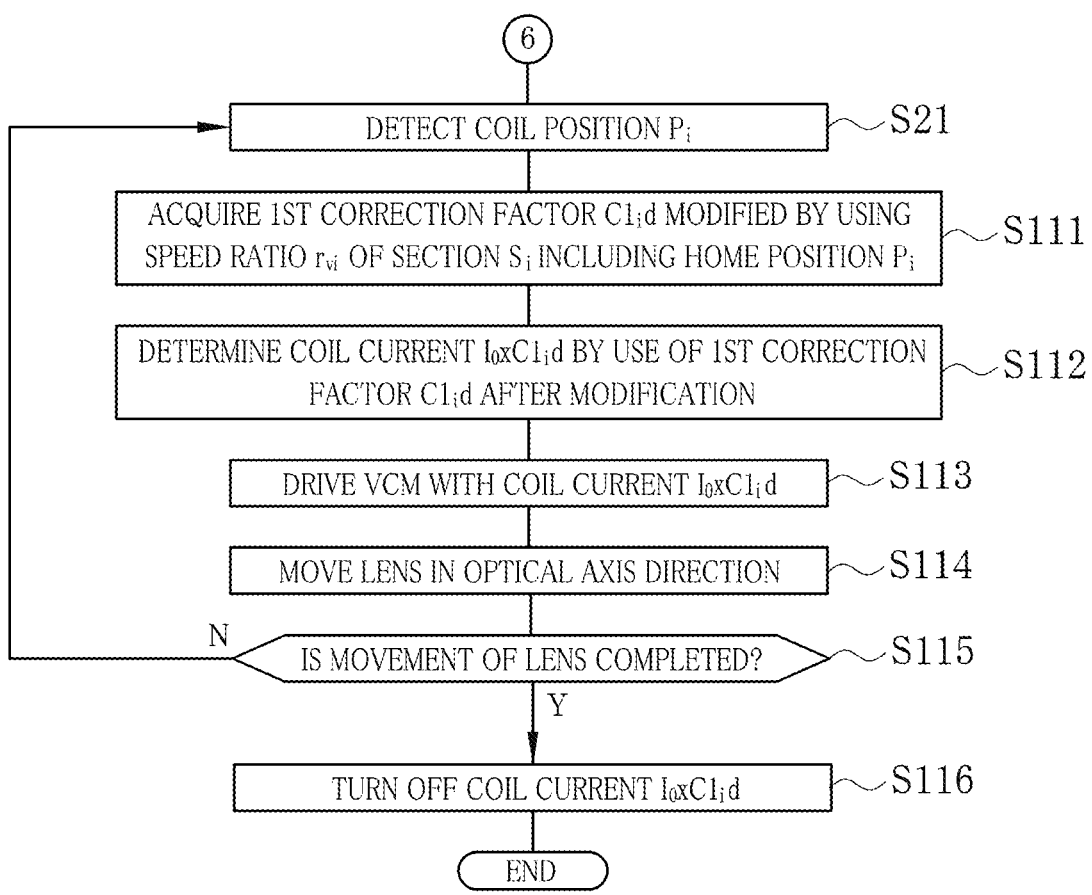
FIG. 31 is a flow chart illustrating remaining steps of driving the lens.

The operation of the sixth embodiment is described with FIGS. 30 and 31. The power source is turned on in the step S10. The current $I_0$ flows from the VCM drivers 27 and 28 through the coils 25 and 26 in the step S100. Then the direction of the current is reversed, to move the lens 17 back and forth in the optical axis direction together with the coils 25 and 26 in step S101. While the coils 25 and 26 move in all of the sections S, the moving time $t_M$ for each section S is measured in the step S102. A monitored moving speed v for each section S is determined according to the moving time $t_M$ for each section S and the section length D of the section S in the step S103. The speed ratio $r_v$ of the moving speed is detected for each section S according to the monitored moving speed v of each section S and the reference moving speed $v_0$ of each section S in the step S104. Then the home position $P_0$ is detected to stop the lens 17 in the home position $P_0$ in the steps S13 and S14.

Then the first correction factor $C1_0$ corresponding to the home position $P_0$ where the lens 17 is stopped is modified by use of the speed ratio $r_{v0}$ of the section $S_0$ including the home position $P_0$, to obtain a first correction factor $C1_0 d$ after being modified in the step S105. Then the current $I_0 \times C1_0 d$ is obtained by use of the first correction factor $C1_0 d$ in the step S106. The coils 25 and 26 are supplied with the corrected current $I_0 \times C1_0 d$ by the VCM drivers 27 and 28 in the step S107. The lens 17 is moved together with the coils 25 and 26 in the step S108. In case the movement of the lens 17 is completed (yes in the step S109), the corrected current $I_0 \times C1_0 d$ is turned off in the step S110.

Assuming that the movement of the lens 17 is not completed (no in the step S109), then the coil position $P_i$ of the lens 17 is detected in the step S21. The first correction factor $C1_i d$ is determined by modifying the first correction factor $C1_i$ with the speed ratio $r_v$, according to the coil position $P_i$ in the step S111. The current $I_0 \times C1_i d$ is determined with the first correction factor $C1_i d$ in the step S112. The coils 25 and 26 are supplied with the corrected current $I_0 \times C1_i d$ by the VCM drivers 27 and 28 in the step S113. After those steps, the lens 17 is moved in the step S114 as illustrated in FIG. 31. Assuming that the movement of the lens 17 is completed (yes in the step S115), the corrected current $I_0 \times C1_i d$ is turned off in the step S116. Assuming that the movement of the lens 17 is not completed (no in the step S115), then the steps S21-S115 are repeated until the movement of the lens 17 is completed.

In the present embodiment, the speed ratio $r_v$ is obtained according to the monitored moving speed v obtained for each section S and the reference moving speed $v_0$ stored for the section S. The first correction factor $C1$ is modified by use of the speed ratio $r_v$ as modification data for the correction factor. It is possible to control a current by use of the first correction factor C1$d$ for each section S. Changes in the speed during the movement of the lens 17 can be suppressed even upon lapse of time, even in case the temperature changes, or even in case a frictional characteristic changes between the guide rods and the guide holes.

Seventh Embodiment

Figure 32:
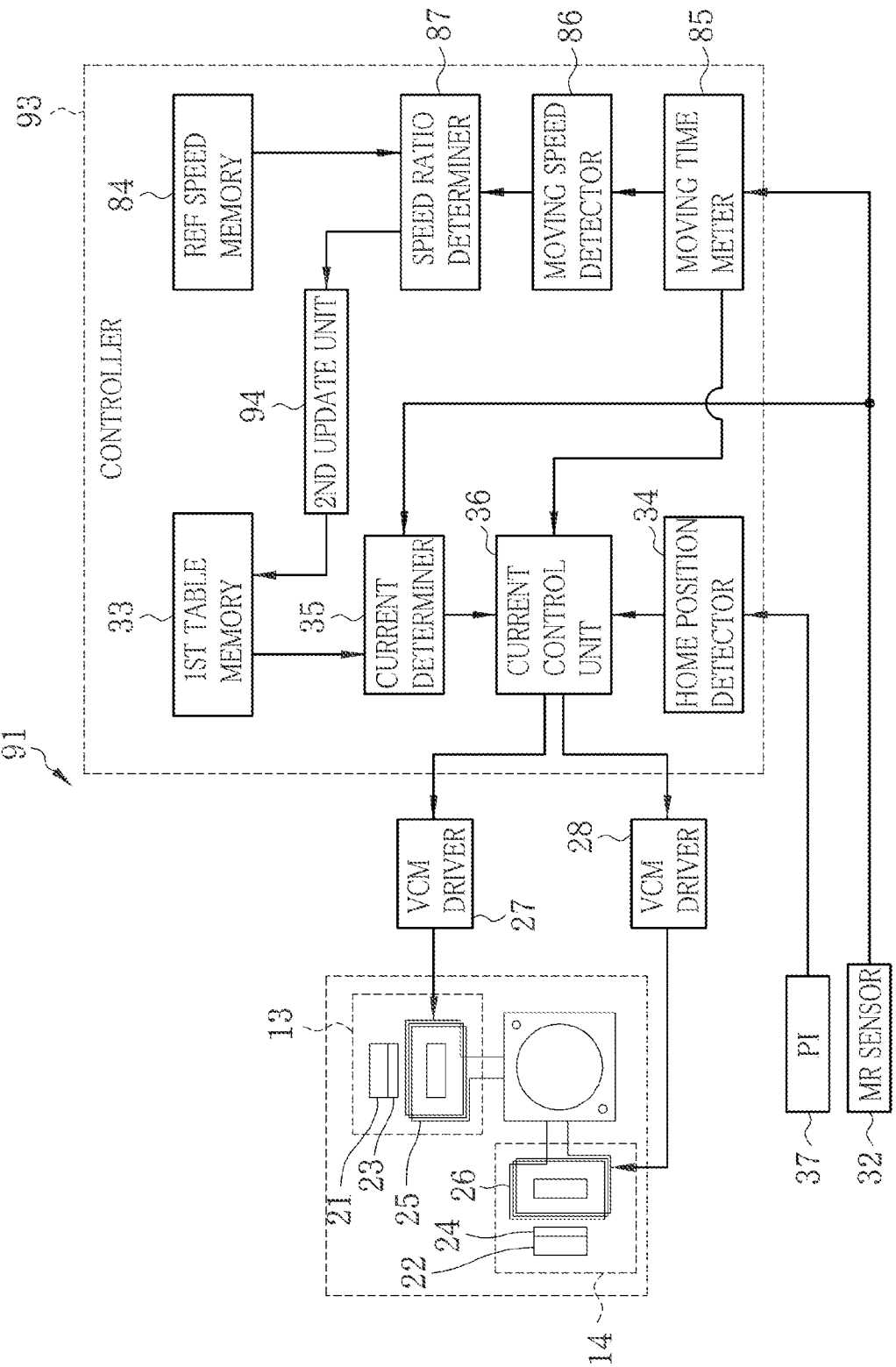
FIG. 32 is a block diagram schematically illustrating a seventh preferred lens driving apparatus.

In the lens driving apparatus 81 of the sixth embodiment, the first correction factor C1 read from the first table memory 33 is modified by use of the speed ratio $r_v$ from the fifth table memory 88 at each time of detecting the coil position P. However, in a lens driving apparatus 91 (lens assembly) of FIG. 32, the first correction factor C1 from the first table memory 33 is modified by use of the speed ratio $r_v$, to obtain a first correction factor C1$d$, with which the first table memory 33 is updated. There is a system controller 93 (controller), which includes a second update unit 94. The second update unit 94 updates the first table memory 33. For the controller 93, the controller 29 or the controller 83 is repeated but with a difference in the second update unit 94. Elements similar to those of the above embodiments are designated with identical reference numerals.

The second update unit 94 updates a first correction factor C1 in the first table memory 33. To this end, the first correction factor C1 of the respective position P of the first table memory 33 is obtained according to the speed ratio $r_v$ of the section S including the coil position P at each time of lapse of a predetermined period, and is overwritten by use of a new value of the first correction factor C1. The updating is performed for all of the coil positions P. A first correction factor C1$d$ after being modified according to the coil position P is read by the current determiner 35 from the first table memory 33 after the updating. The current $I_0$ is corrected by use of the first correction factor C1$d$ after being modified.

The operation of the seventh embodiment is described next by referring to the flowcharts of FIGS. 30, 33 and 34. In a manner similar to the sixth embodiment, the coils 25 and 26 are moved back and forth with the current $I_0$ by turning on the power source (not shown) as illustrated in FIG. 30. The monitored moving speed v is determined according to the moving time $t_M$ measured for each section S and the section length D of the section S, and then compared with the reference moving speed $v_0$ stored previously, to detect a speed ratio $r_v$ for each section S in the steps S10 and S100-S104.

Figure 33:
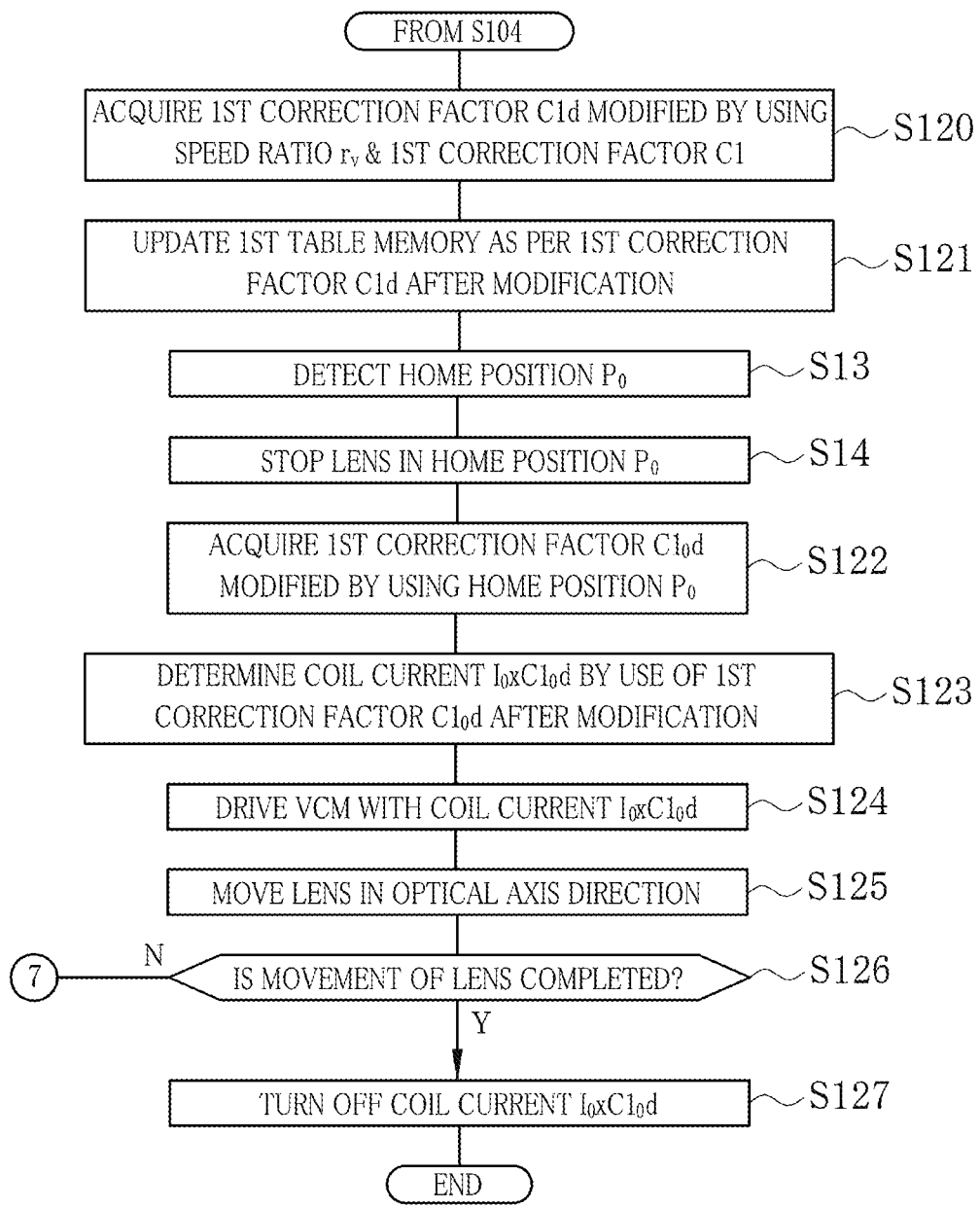
FIG. 33 is a flowchart illustrating steps at the beginning of driving the lens.
Figure 34:
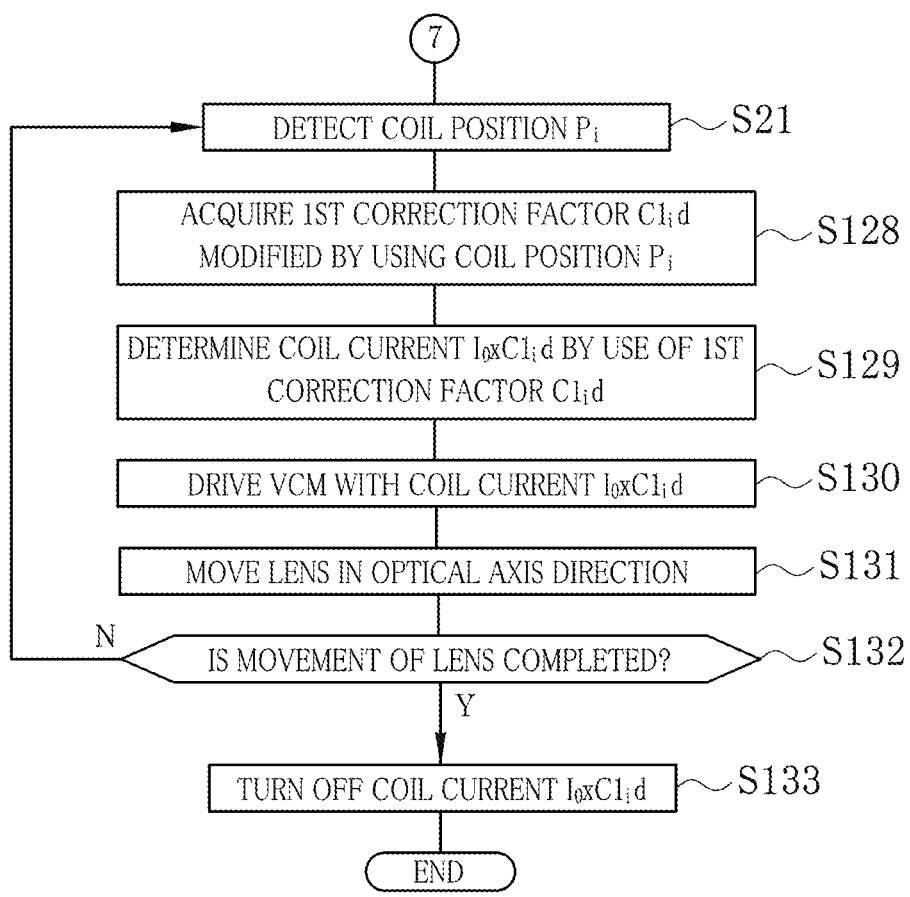
FIG. 34 is a flow chart illustrating remaining steps of driving the lens.

In FIG. 33, the first correction factor C1$d$ after being modified is determined according to the detected speed ratio $r_v$ of each section S and the first correction factor C1 stored in the first table memory in correspondence with the coil position P included in the section S. See the step S120. The first correction factor C1 of the coil position P is overwritten by use of the first correction factor C1$d$ after being modified of the same coil position P, to update the first table memory in the step S121. The home position $P_0$ is detected, to stop the lens 17 in the home position $P_0$ in the steps S13 and S14.

Then the first correction factor C1$_0d$ after being modified is acquired from the first table memory 33 being updated according to the home position $P_0$ of the stop of the lens 17 in the step S122. A current $I_0 \times C1_0d$ is determined by correcting the current $I_0$ with the first correction factor C1$_0d$ after the modification in the step S123. The corrected current $I_0 \times C1_0d$ is caused to flow through the coils 25 and 26 by the VCM drivers 27 and 28 in the step S124. The lens 17 is moved together with the coils 25 and 26 by the corrected current $I_0 \times C1_0d$ in the step S125. Assuming that the movement of the lens 17 is completed (yes in the step S126), the corrected current $I_0 \times C1_0d$ is turned off in the step S127.

Assuming that the movement of the lens 17 is not completed (no in the step S126), the coil position $P_i$ is detected in the step S21. See FIG. 34. A modified value of the first correction factor C1$_id$ corresponding to the coil position $P_i$ is acquired from the first table memory 33 in an updated state in the step S128. A corrected current $I_0 \times C1_0d$ is determined by correcting the current $I_0$ with the modified value of the first correction factor C1$_id$ in the step S129. The corrected current $I_0 \times C1_0d$ is caused to flow through the coils 25 and 26 by the VCM drivers 27 and 28 in the step S130. Thus, the lens 17 moves together with the coils 25 and 26 in the step S131. Assuming that the movement of the lens 17 is completed (yes in the step S132), the corrected current $I_0 \times C1_id$ is turned off in the step S133. Assuming that the movement of the lens 17 is not completed (no in the step S132), the steps S21-S132 are repeated until completion of the movement of the lens 17.

In the present embodiment, the first table memory 33 is updated by use of the first correction factor C1$d$ modified with the speed ratio $r_v$. Thus, no table memory is required for storing the speed ratio $r_v$ for each section S in comparison with modifying the first correction factor C1 by use of the speed ratio $r_v$ at each time of detecting the coil position P. Capacity of a memory area in the storage medium can be saved. Also, load to the apparatus can be reduced in comparison with a structure of always modifying the first correction factor C1, because the first table memory 33 is updated upon the lapse of the predetermined period.

In the seventh embodiment, the first table memory 33 is updated upon the lapse of the predetermined period. However, the first table memory 33 can be updated always at a small period.

It is possible to measure the moving time $t_M$ by moving the coils 25 and 26 back and forth at any one time point of depressing a measuring button (not shown) for starting measurement of the moving time in the sixth and seventh embodiments. Assuming that the moving time $t_M$ is not measured again even at a lapse of a predetermined period from the preceding measurement of the moving time $t_M$, it is possible to generate an alarm signal for encouraging modification of the first correction factor C1 by use of the speed ratio $r_v$ obtained by measuring the moving time $t_M$, for example, alarm indicia, alarm sound and the like.

In the sixth and seventh embodiments, the number of the sections S and the section length D (moving distance) of each section S stored in the reference speed memory 84 are equal to the counterparts used in the moving time meter 85 for measuring the moving time. It is possible to modify a first correction factor C1 by use of the moving time $t_M$ without obtaining the monitored moving speed v for each section S. It is necessary to store a reference moving speed $t_{M0}$ for each of the sections S. The measured moving time $t_M$ measured in back and forth movement is compared with the reference moving speed $t_{M0}$, to obtain a time ratio $r_t$ between those for each section S. As the section length D of the sections S is equally predetermined, the moving speed is high in one of the sections S with short moving time $t_M$, and is low in one of the sections S with long moving time $t_M$. In view of this, the first correction factor C1 is modified by use of the time ratio $r_t$, to control the current by use of the first correction factor C1$d$ after being modified. It is possible to move in the respective sections S at an equal moving speed, as the moving time is equal between the sections S.

The above-described embodiments can be combined with one another under a condition without inconsistency, namely, at least two of the first to seventh embodiments. Although the VCMs are two in the first to seventh embodiments, one or three or more VCMs can be used. In those embodiments, the first voice coil motor 13 is disposed higher than the lens barrel 12, the second voice coil motor 14 being disposed on the right side of the lens barrel 12. However, the voice coil motors can be disposed in various positions under a condition of keeping the lens holder 18 movable in the optical axis direction.

In each of the above embodiments, it is possible in the current determiner 55 to start the correction of a current immediately after depressing a power button (not shown) for turning on the power source.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens driving apparatus for a lens supported in a lens holder movable in an optical axis direction, comprising:
   a voice coil motor, having a magnet extending in said optical axis direction, and a coil disposed in a magnetic field of said magnet and coupled to said lens holder, for generating electro-magnetic force by flow of a coil current, to move said lens holder together in said optical axis direction;
   a position detector for detecting a coil position of said coil relative to said magnet in said optical axis direction;
   a first table memory for storing a first correction factor for compensating for a low level area in flux density distribution of said magnet in said optical axis direction in relation to respectively said coil position;
   an initial flux density memory for storing initial flux density of said magnet set in a reference position;
   a flux density measurer for measuring monitored flux density of said magnet in said reference position;
   a flux density ratio determiner for determining a flux density ratio between said initial flux density and said monitored flux density being measured by said flux density measurer;
   a factor modification unit for modifying said first correction factor stored in said first table memory by use of said flux density ratio in relation to respectively said coil position;
   a controller for correcting said coil current according to said first correction factor read out from said first table memory according to said coil position detected by said position detector.

2. A lens driving apparatus as defined in claim 1, wherein said flux density measurer measures said monitored flux density upon powering up.

3. A lens driving apparatus as defined in claim 1, wherein said flux density measurer measures said monitored flux density at each time that a predetermined period elapses; further comprising a first update unit for updating said first table memory for respectively said coil position according to a new value of said first correction modified by use of said flux density ratio.

4. A lens driving apparatus as defined in claim 1, further comprising:
   an angle detector for detecting an elevation/depression angle of a lens barrel containing said lens holder;
   a second table memory for storing a second correction factor for compensating for a low force area in said electro-magnetic force changeable according to a change in said elevation/depression angle in relation to respectively said elevation/depression angle;
   wherein said controller corrects said coil current by use of said second correction factor read out from said second table memory according to said elevation/depression angle being detected by said angle detector.

5. A lens driving method for a lens supported in a lens holder movable in an optical axis direction, comprising steps of:
   using a voice coil motor, having a magnet extending in said optical axis direction, and a coil disposed in a magnetic field of said magnet and coupled to said lens holder, for generating electro-magnetic force by flow of a coil current, to move said lens holder together in said optical axis direction;
   detecting a coil position of said coil relative to said magnet in said optical axis direction;
   acquiring a first correction factor from a first table memory according to said coil position being detected, said first table memory storing said first correction factor for compensating for a low level area in flux density distribution of said magnet in said optical axis direction in relation to respectively said coil position;
   measuring monitored flux density of said magnet;
   determining a flux density ratio between initial flux density of said magnet being stored and said monitored flux density being measured;
   modifying said first correction factor by use of said flux density ratio in relation to respectively said coil position;
   correcting said coil current according to said first correction factor.

6. A lens driving method as defined in claim 5, further comprising steps of:
   detecting an elevation/depression angle of a lens barrel containing said lens holder;
   storing a second correction factor in a second table memory for compensating for a low force area in said electro-magnetic force changeable according to a change in said elevation/depression angle in relation to respectively said elevation/depression angle;
   wherein in said current correcting step, said coil current is corrected by use of said second correction factor readout from said second table memory according to said elevation/depression angle being detected.

* * * * *